United States Patent [19]
McFarlane et al.

[11] Patent Number: 5,398,598
[45] Date of Patent: *Mar. 21, 1995

[54] FOOD PROCESSING TRANSPORT SYSTEM

[75] Inventors: Claude L. McFarlane, Madison; David E. Lukens, Lodi; Dennis F. Conohan, Cross Plains; Steve O. Schultz, Pardeeville; Wendell J. Holl, Lodi; Mark A. Persson, Arlington, all of Wis.

[73] Assignee: DEC International, Inc., Madison, Wis.

[*] Notice: The portion of the term of this patent subsequent to Apr. 14, 2009 has been disclaimed.

[21] Appl. No.: 120,901

[22] Filed: Sep. 13, 1993

Related U.S. Application Data

[60] Continuation-in-part of Ser. No. 840,959, Feb. 21, 1992, Pat. No. 5,244,683, which is a division of Ser. No. 534,130, Jun. 6, 1990, Pat. No. 5,103,718, which is a continuation-in-part of Ser. No. 481,998, Feb. 16, 1990, abandoned.

[51] Int. Cl.⁶ .......................... A23L 1/01; B65G 17/00
[52] U.S. Cl. ...................................... 99/443 C; 99/448; 99/467; 198/561; 198/579; 198/685
[58] Field of Search ............... 99/477, 485, 443 C, 99/352, 483, 482, 535, 534, 355, 448, 386, 426, 441, 467; 426/315, 523, 524, 520; 198/561, 579, 602, 680, 682, 683, 685

[56] References Cited

U.S. PATENT DOCUMENTS

| | | | |
|---|---|---|---|
| 5,103,718 | 4/1992 | Schreiber et al. | 99/443 C |
| 5,244,683 | 9/1993 | Schreiber et al. | 426/315 |

*Primary Examiner*—Timothy F. Simone
*Attorney, Agent, or Firm*—Andrus, Sceales, Starke & Sawall

[57] ABSTRACT

A food product processing transport system (300) includes an overhead transport rail (302) having first and second runs (356 and 358, 390 and 392), a food product carrier (310) suspended from the rail and defining a vertical plane, a drive mechanism (326) for advancing the carrier along the rail, and a turning arrangement (354, 394) between the first and second runs and changing the relative orientation between the vertical plane defined by the carrier and the direction of advancement of the carrier. The carrier includes a slider block (312) slidable along the rail.

15 Claims, 15 Drawing Sheets

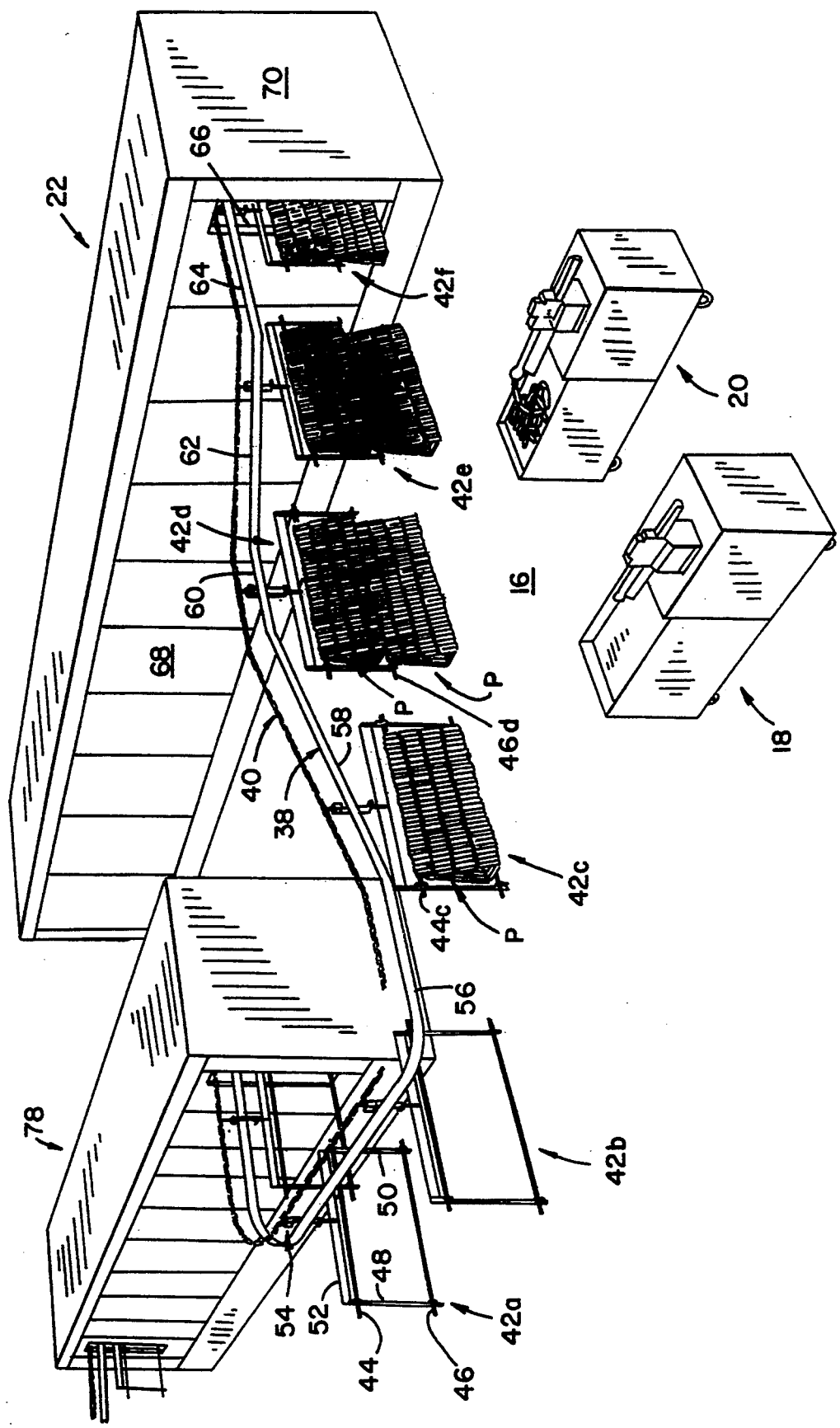

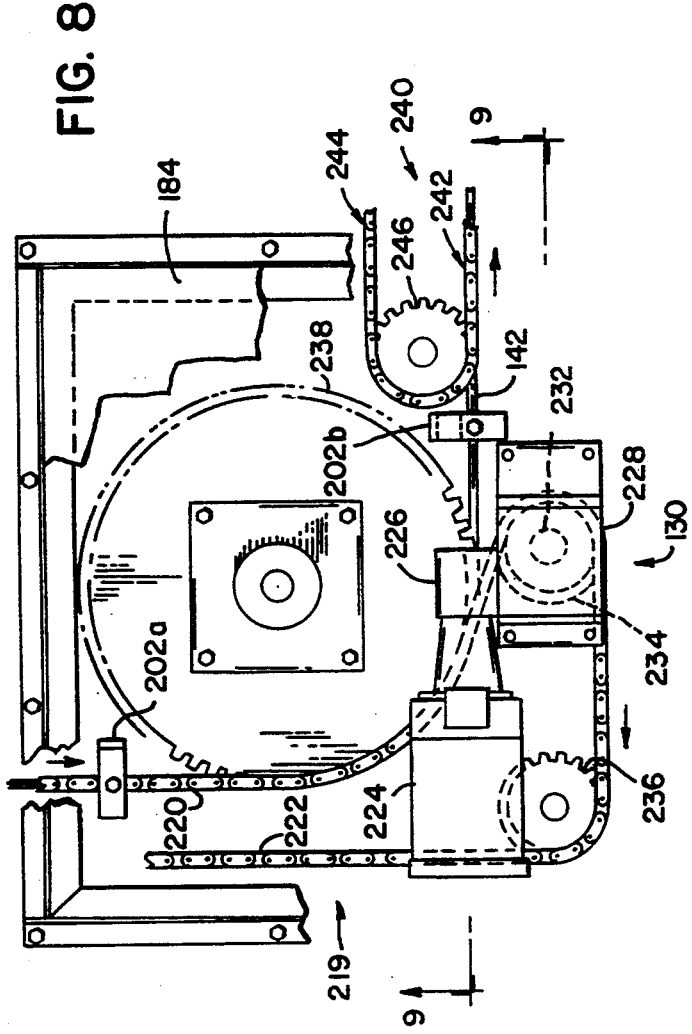
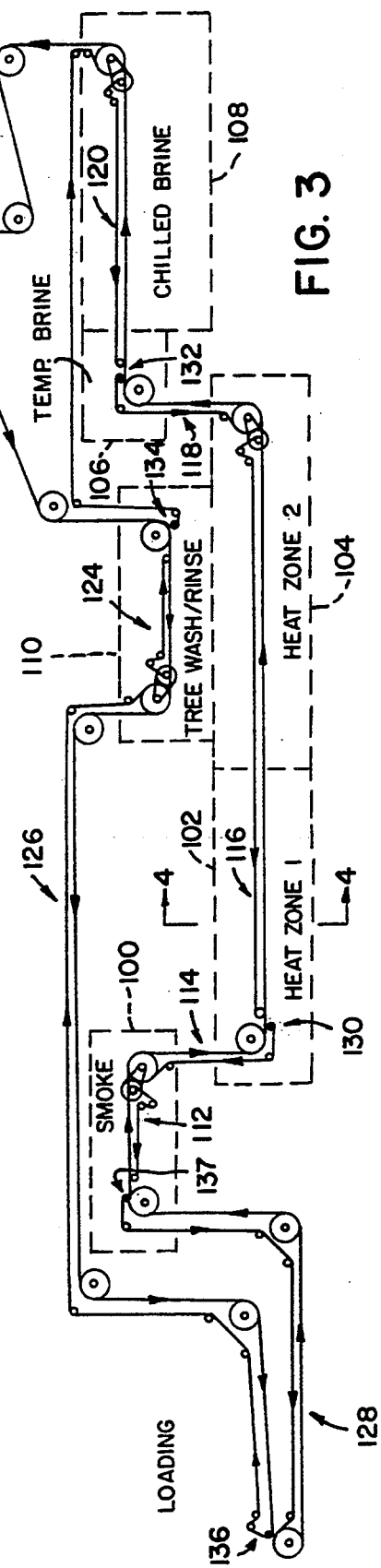
FIG. 8
FIG. 3

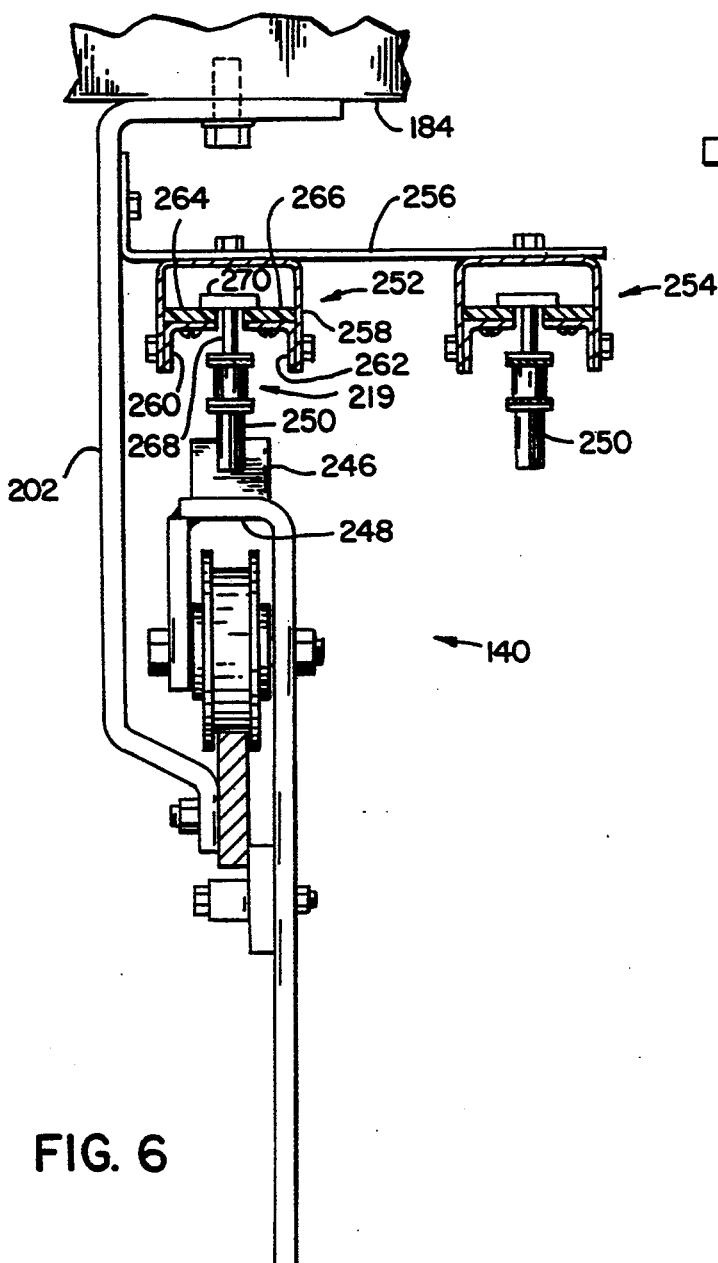
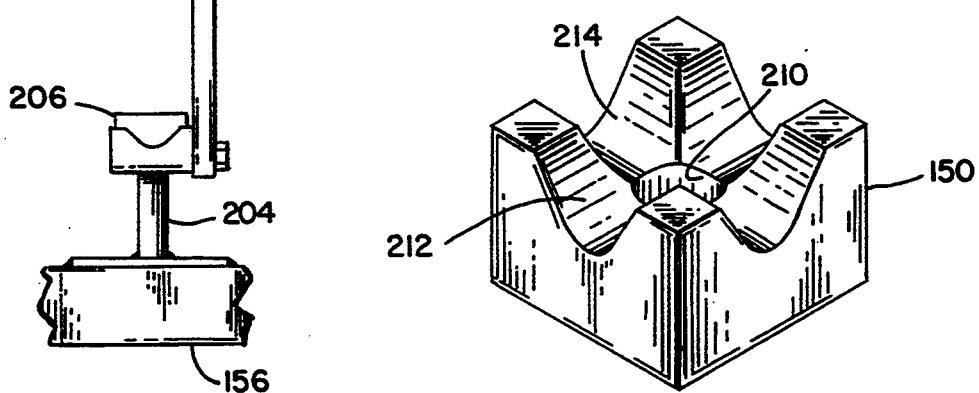
FIG. 5
FIG. 6
FIG. 7

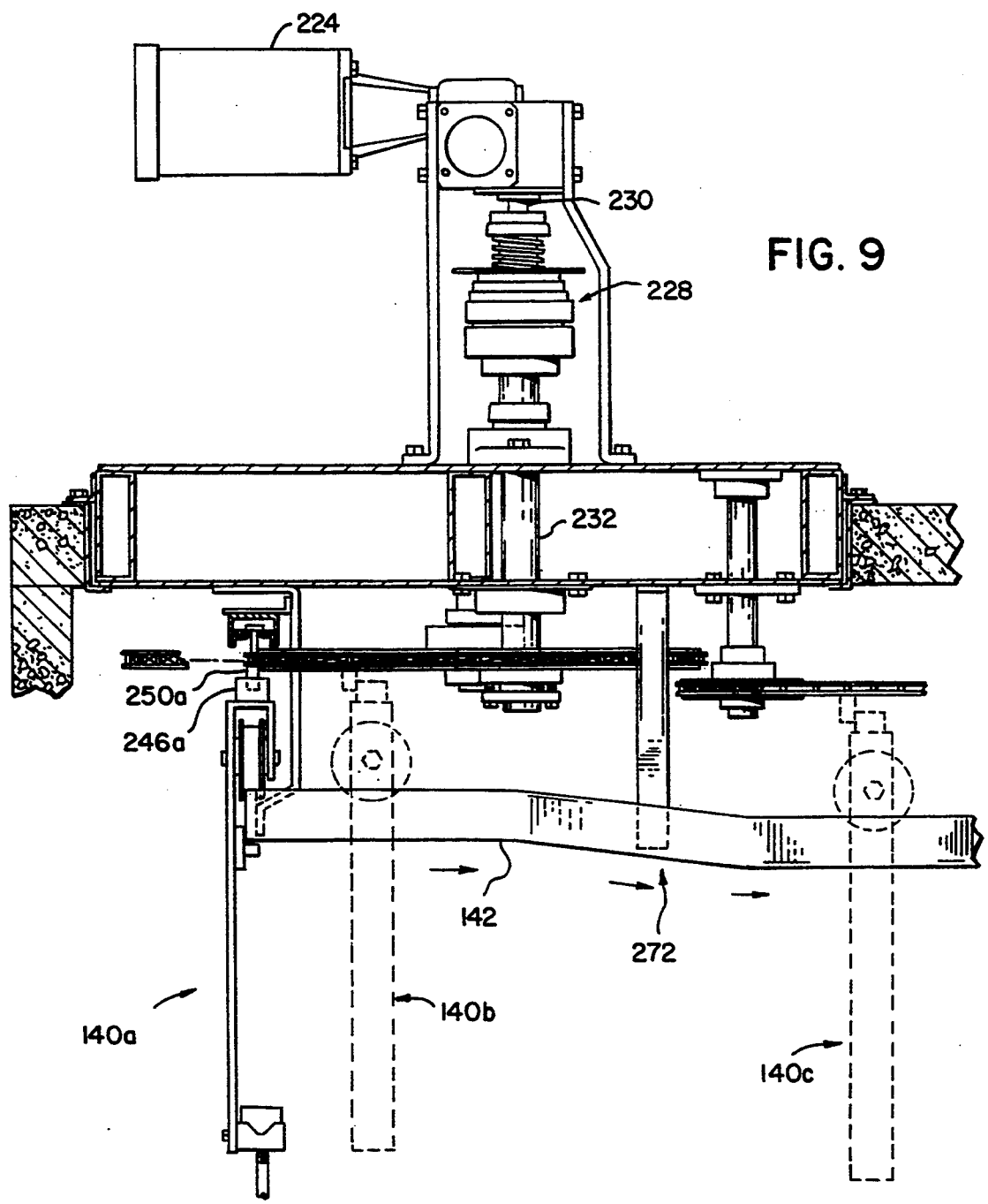

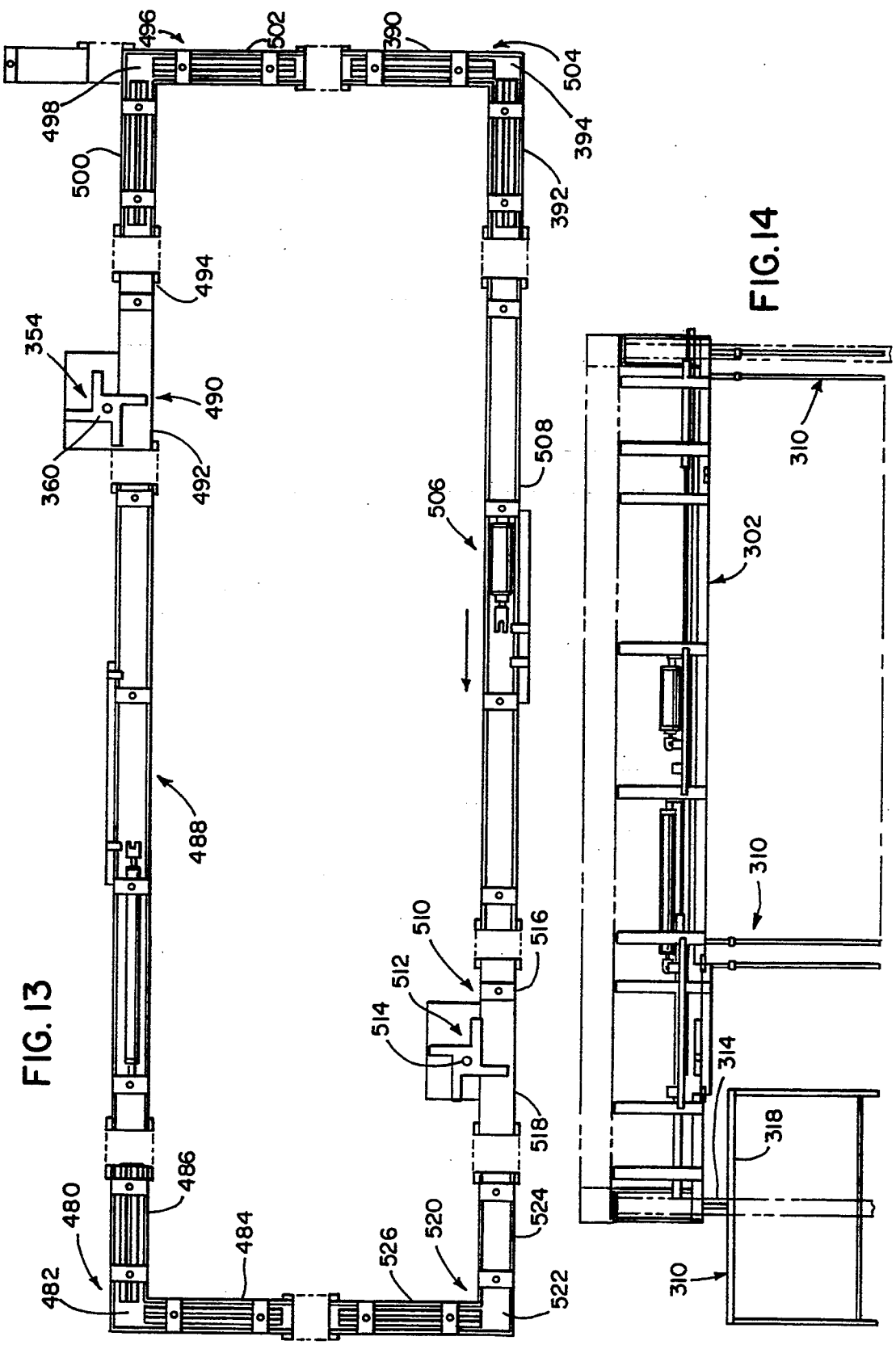

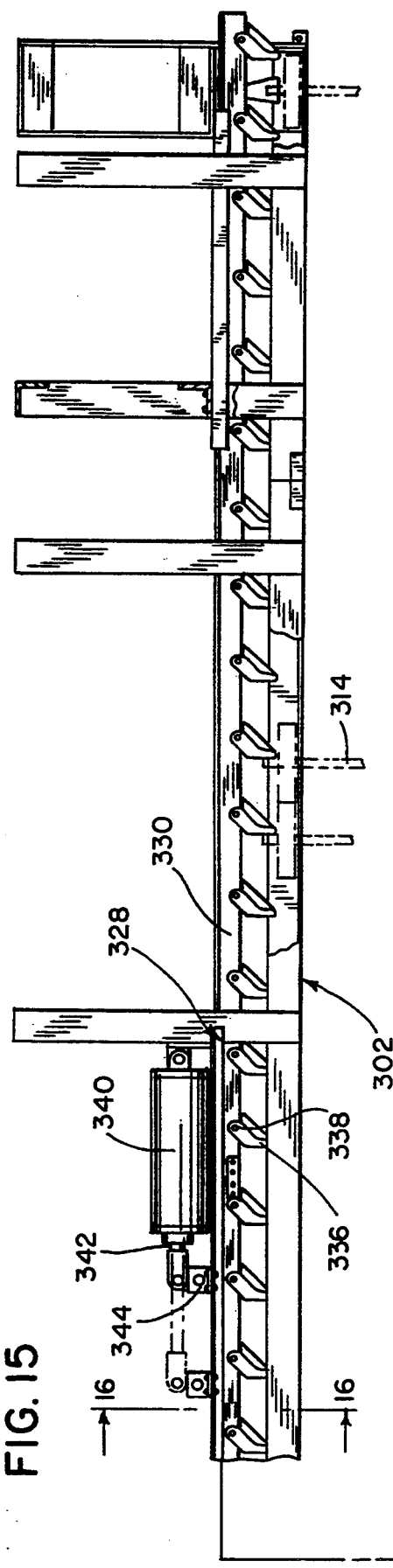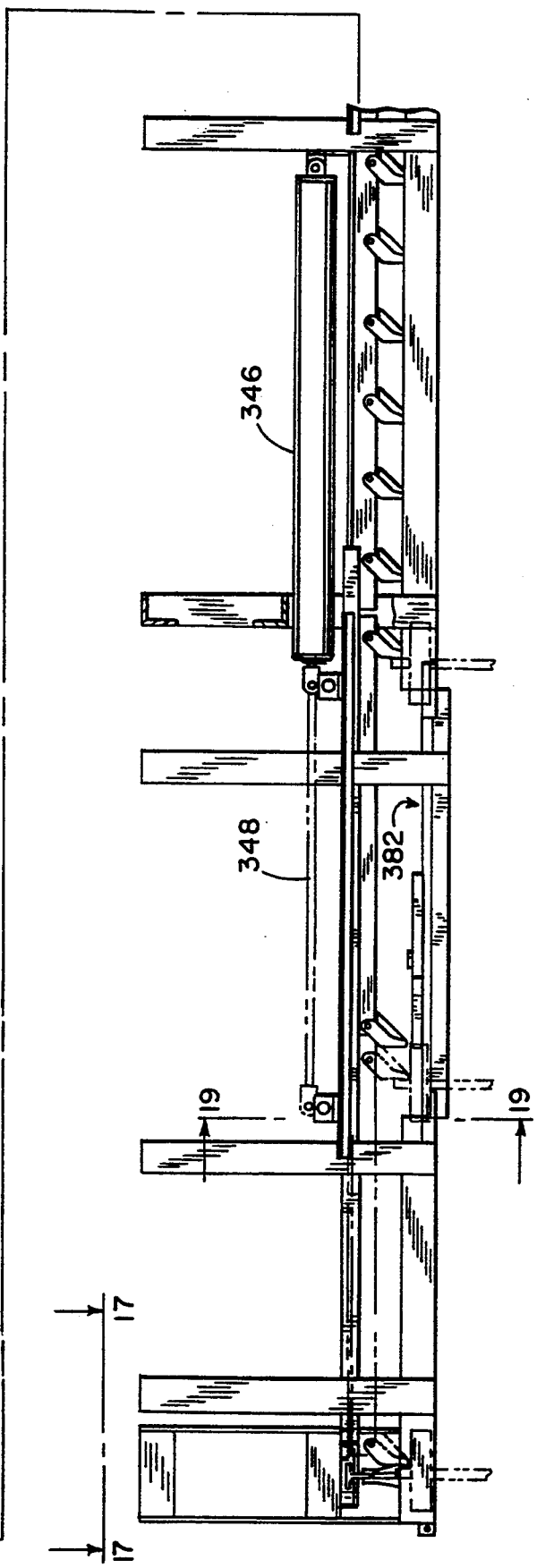
FIG. 15

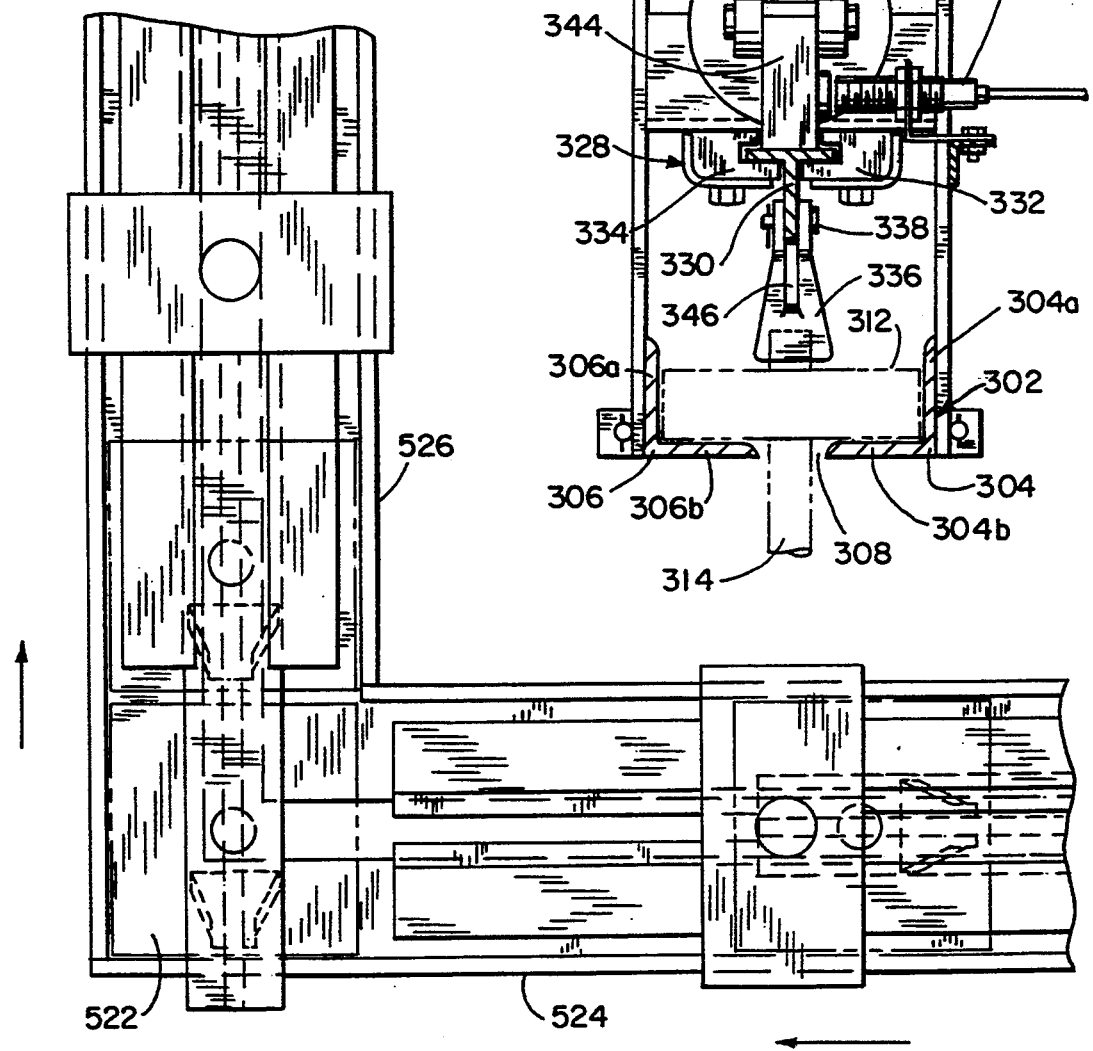

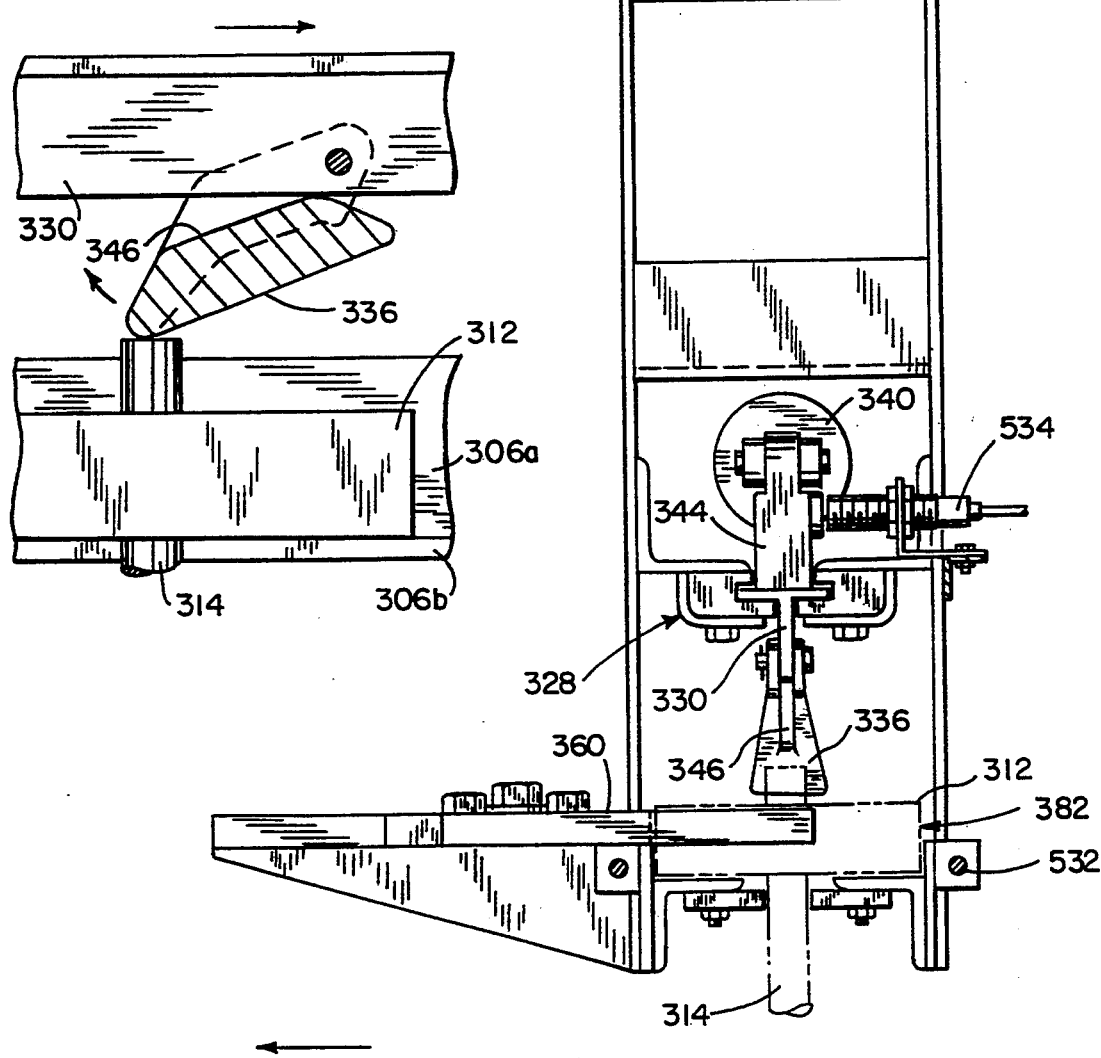
FIG. 19
FIG. 18(a)
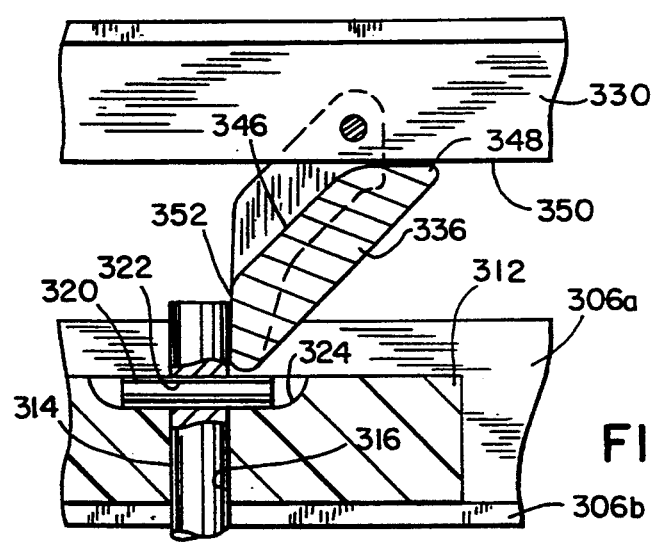
FIG. 18(b)

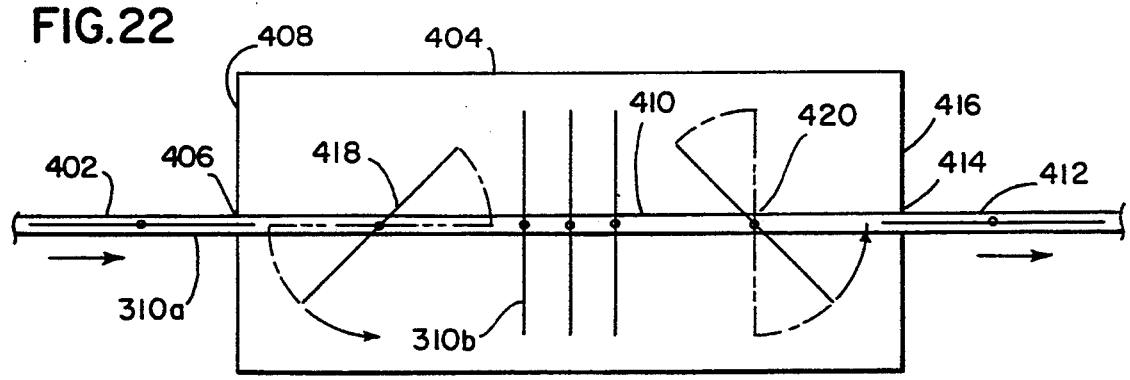
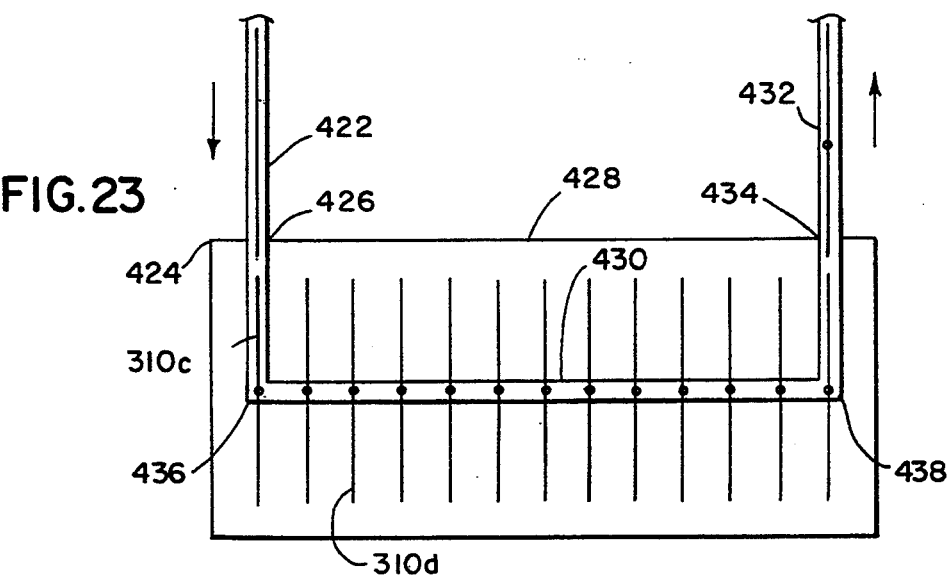
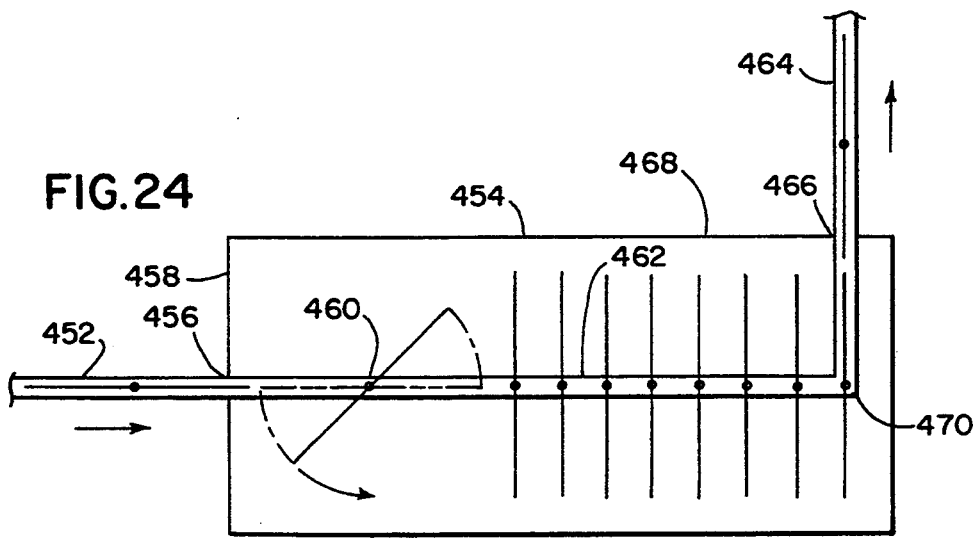

FOOD PROCESSING TRANSPORT SYSTEM

CROSS REFERENCE TO RELATED APPLICATIONS

This application is a continuation-in-part of U.S. application Ser. No. 07/840,959, filed Feb. 21, 1992, now U.S. Pat. No. 5,244,683, which is a division of U.S. application Ser. No. 07/534,130, filed Jun. 6, 1990, now U.S. Pat. No. 5,103,718, issued Apr. 14, 1992, which is a continuation-in-part of U.S. application Ser. No. 07/481,998, filed Feb. 16, 1990, abandoned.

BACKGROUND AND SUMMARY

The invention of the parent application relates to a processing system for a food product, and more particularly to a meat processing arrangement in which the meat product is sequentially moved through processing chambers.

Various systems are known for processing food products which are suspended from carrier structures. One such system is a continuous or in-line processing system, which provides a product inlet at one end and a product outlet at the other. Between the inlet and the outlet are various processing zones or chambers.

The parent invention has as its object to provide a processing system having greater flexibility in layout than previous systems, and also to provide discrete boundaries between the various zones of the processing operation.

In accordance with the parent invention, a food product processing system comprises a plurality of processing chambers, each chamber having a product inlet and a product outlet. The chambers are arranged in a non-linear fashion, and are isolated from each other such that the outlet of one chamber is spaced from the inlet of the chamber downstream therefrom. Product advancing means is provided for advancing the food product through the plurality of processing chambers and for providing movement of the food product through the space between the outlet of one of the chambers and the inlet of the chamber downstream therefrom. In a preferred embodiment, each chamber has its product inlet and its product outlet formed in a sidewall of the chamber, and the outlet of one chamber is preferably substantially aligned with the inlet to the downstream chamber. The product is carried on a plurality of individual product carriers, which are suspended from an overhead rail. Each product carrier has a wheeled trolley assembly movably mounted on the rail. The advancing means preferably comprises a chain drive system which moves the suspended product carriers on the rail. The chain drive system preferably includes a plurality of individual conveyances or loops, each including a drive run located over the rail and a return run spaced laterally from the drive run. The loops are preferably arranged such that a single drive assembly is disposed between and drives two loops, one of which advances the product carriers at a relatively slow speed through a processing chamber, and the other of which advances the product carriers between processing chambers at a relatively fast speed. The rail is arranged in a continuous loop, passing through the various processing chambers. In a preferred embodiment, the rail passes by an unloading area after discharge from the final processing chamber, and by a loading area prior to entry into the inlet of the initial processing chamber. Each product carrier preferably includes an upper product carrying area and a lower product carrying area. The elevation of the rail preferably varies adjacent to the loading area so as to accommodate loading of the product onto the upper and lower product carrying areas. Preferably, a carrier washing chamber is arranged between the final processing chamber and the initial processing chamber. The carriers are passed through the washing chamber after discharge from the final chamber and prior to entry into the initial chamber.

In advancing the product through the various chambers, the rail preferably enters each chamber through its sidewall in a direction substantially perpendicular to the longitudinal axis of the chamber. Inside the chamber, the rail is preferably disposed substantially parallel to the longitudinal axis of the chamber, and the individual product carriers follow the path of the rail. To achieve maximum product density within the interior of each chamber, the product trees are capable of turning relative to the rail so as to remain substantially perpendicular to the longitudinal axis of the chamber during entry into the chamber, passage of the product carriers through the chamber, and during discharge of the carriers from the chamber.

The parent invention also contemplates a method of processing a food product, substantially in accordance with the foregoing description.

The present invention provides further improvements in the food processing transport system.

BRIEF DESCRIPTION OF THE DRAWINGS

FIG. 2 is an isometric view of a portion of the processing system of FIG. 1.

FIG. 3 is a schematic plan view showing an actual embodiment of a processing system constructed according to the parent invention.

FIG. 5 is a partial sectional view taken generally along line 5—5 of FIG. 4.

FIG. 6 is an enlarged partial front elevation view of the chain drive system for advancing the product carriers on the rail.

FIG. 7 is an enlarged isometric view showing a base member adapted for interposition between the trolley assembly and the product carrier for allowing turning of the product carrier relative to the rail.

FIG. 8 is an enlarged plan view, with portions broken away, showing an area at the downstream end of one conveyor loop and the upstream end of the adjacent down-stream conveyor loop.

FIG. 9 is a partial sectional view taken generally along line 9—9 of FIG. 8.

FIG. 13 is a plan view similar to FIG. 12.

FIG. 14 is a side view of the system of FIG. 12.

FIG. 15 is an enlarged side view of a portion of the system of FIG. 12.

FIG. 16 is a view taken along line 16—16 of FIG. 15.

FIG. 17 is a view taken along line 17—17 of FIG. 15.

FIGS. 18a and 18b are an enlarged view of a portion of the structure of FIG. 15 and illustrate operation.

FIG. 19 is a view taken along line 19—19 of FIG. 15.

FIG. 22 is a top schematic plan view illustrating one embodiment of the system of FIG. 12.

FIG. 23 is a top schematic plan view illustrating another embodiment of the system of FIG. 12.

FIG. 24 is a top schematic plan view illustrating another embodiment of the system of FIG. 12.

DETAILED DESCRIPTION
PARENT APPLICATION

Figure 1:
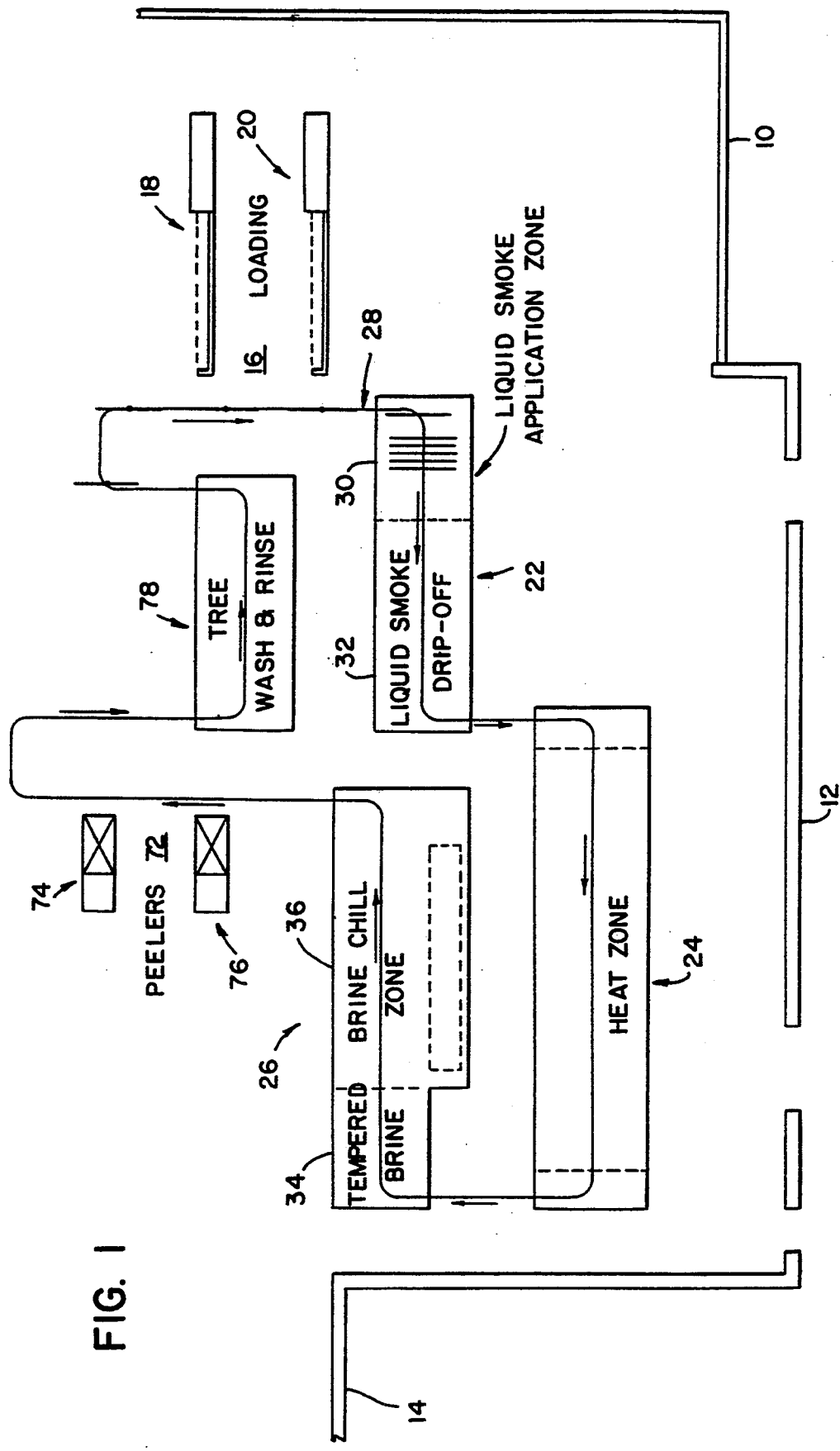
FIG. 1 is a plan view showing a proposed processing system constructed according to the parent invention.

Referring to FIG. 1, a food processing system according to the parent invention is shown as housed within a building, certain walls of which are shown at 10, 12 and 14, defining a bay in which the system of the parent invention is located.

The system generally includes a loading area 16, and a pair of machines 18, 20 are located at loading area 16 which output a string of raw meat products such as hot dogs or sausages, contained within a continuous string of casings.

The system generally comprises a series of cabinets 22, 24 and 26, with an overhead conveying system schematically represented at 28 intertwined through cabinets 22, 24 and 26.

Each of cabinets 22, 24 and 26 performs a distinct processing step for processing the meat product. In particular, cabinet 22 provides a zone 30 for applying smoke to the product. Cabinet 24 provides a heat zone for cooking the product. Cabinet 26 provides an initial area 34 in which the product is exposed to a tempered brine solution, and an area 36 in which the product is exposed to a chilled brine solution.

As shown in FIG. 2, the overhead conveying system generally includes a rail 38 having a chain 40 disposed thereabove. Chain 40 is interconnected with a suitable driving sprocket arrangement, for providing movement of chain 40 above rail 38 along the length of rail 38. It is understood that chain 40 may comprise a series of chain segments.

A plurality of product carrying trees, shown at 42a–42f, are suspended from rail 38. Referring to tree 42a, each tree includes an upper stick 44 and a lower stick 46, which extend between vertical supports 48, 50. A cross-member 52 is provided between vertical supports 48, 50.

Referring again to tree 42a, each tree is mounted to a trolley assembly 54, which is provided with one or more wheels which ride on top of rail 38. An engagement system is provided between the trolleys (54) and chain 40, so that movement of chain 40 above rail 38 engages the trolleys (54) for moving the product trees 42a–42f along rail 38.

Rail 38 includes an upstream lower portion 56, an inclined portion 58, an upper portion 60, and inclined portion 62 and a downstream lower portion 64. Referring to tree 42c, it is seen that its upper stick 44c is loaded with a string of linked meat product, shown at P. This loading operation occurs while tree 42c is on upstream lower portion 56 of rail 38, with stick 44c being loaded from product output from machine 18. As chain 40 continues its movement so as to move the product trees toward cabinet 22, the trees travel up inclined portion 58 of rail 38 and to upper portion 60, where tree 42d is shown in FIG. 2. When tree 42d is in this position, the elevation at which its lower stick 46d is to be placed onto the tree is raised, thus making it more ergonomically efficient for the operator to load stick 46d with product output from machine 20 and to place the loaded stick 46d onto tree 42d. After the tree is fully loaded, it travels down inclined area 62, where tree 42e is shown, to lower downstream portion 64.

As also shown in FIG. 2, cabinet 22 is provided with an inlet opening 66 at the end of its sidewall 68 adjacent to an end wall 70. The product trees enter cabinet 22 through opening 66, as shown, with rail 38 at lower downstream portion 64 extending through opening 66 into the interior of cabinet 22. As shown in FIG. 1, cabinet 22 is provided with a discharge outlet in the sidewall opposite sidewall 68 adjacent the end wall opposite end wall 70.

Throughout most of the length of cabinet 22, rail 38 is oriented parallel to and coincident with the longitudinal axis of cabinet 22. At the entrance of rail 38 into cabinet 22 at inlet 66, rail 38 is oriented substantially perpendicular to the longitudinal axis of cabinet 22. At its outlet from cabinet 22, rail 38 is also oriented perpendicular to the longitudinal access of cabinet 22.

This feature of the parent invention is also shown in FIG. 1. Like cabinet 22, cabinets 24 and 26 also have their inlet and outlet openings formed in the sidewalls of the cabinets, with the rail extending through the inlet and outlet openings being perpendicular to the longitudinal axis of the cabinet, and a portion between the inlet and the outlet extending along the longitudinal axis of the cabinet.

The outlet of cabinet 22, as well as the inlets and outlets of cabinets 24 and 26, are similar in placement and construction to inlet 66 shown with respect to cabinet 22.

As shown in FIG. 1, trees 42 remain in a substantially constant orientation relative to the cabinets, such as 22, during entry into the cabinets, passage through the cabinets and discharge from the cabinets. Trees 42 turn relative to conveyor assembly 28 after entry into the cabinets, such as 22, and are conveyed through the cabinets so as to be relatively closely spaced during passage therethrough to provide maximum utilization of the interior cabinet space, and thereby efficient processing. As the trees approach the end wall of the cabinet adjacent the discharge outlet, the trees again turn relative to the conveyor assembly, thereby allowing them to pass sideways through the relatively narrow discharge opening in the sidewall of the cabinet. Conveyor assembly 28 then moves the trees across the space between the outlet of one cabinet and the inlet of the downstream cabinet, where the same action again occurs.

After the product has passed through cabinets 22, 24 and 26 as described, it is discharged from the outlet of cabinet 36 to an unload station, shown at 72 in FIG. 1. A pair of peeling machines 74, 76 are provided at unload station 72. The product is removed from the product trees at station 72 and fed into peelers 74 and 76, for removing the casings from the product in preparation for final packaging. Like the elevating and deelevating arrangement of rail 38 at load station 16, a similar arrangement is provided at unload station 72 for accommodating unloading of the product from the product trees.

After the product trees have been emptied, the sticks are returned to the product trees and the trees move through a wash and rinse cabinet, shown in FIGS. 1 and 2 at 78. Within cabinet 78, the product trees are washed and rinsed in preparation for another processing cycle, and the manner in which the product trees pass through cabinet 78 is similar to that of cabinets 22, 24 and 26, in that the trees turn relative to the rail after entry into cabinet 78 and prior to discharge therefrom. Once the washed and rinsed product trees are discharged from cabinet 78, they are again routed to load station 16 where product is again loaded onto the product trees in preparation for processing, as described above.

With the parent invention as shown and described, optimal utilization of the plant floor space is achieved, and the arrangement of the processing system can be designed so as to accommodate the floor space available. By turning the product trees relative to the rail after the trees enter the cabinets, maximum utilization of the interior cabinet volume is achieved.

FIGS. 3-11 illustrate in greater detail a system for carrying out the principles shown in FIGS. 1 and 2. Referring to FIG. 3, a food product processing system comprises a smoke application chamber 100, a first heat chamber 102, a second heat chamber 104, a tempered brine chamber 106, a chilled brine chamber 108, and a tree washing and rinsing chamber 110. The drive system for advancing the product carriers comprises a rail, as disclosed in FIGS. 1 and 2, and a plurality of conveyor loops shown generally at 112, 114, 116, 118, 120, 122, 124, 126 and 128. Loops 112-128 each include a drive chain having a drive run and a return run, with each run being disposed in a substantially horizontal plane. A series of drive assemblies shown at 130, 132, 134, 136 and 137 are provided for imparting movement to the drive chains defining loops 112-128. Rail 56 is mounted below the drive run of each of conveyor loops 112-128.

Drive assembly 130 is provided for imparting movement to conveyor loops 112, 114. Similarly, drive assembly 132 imparts movement to loops 116, 118; drive assembly 134 imparts movement to loops 120, 122; drive assembly 136 imparts movement to loops 124, 126 and drive assembly 137 imparts movement to loop 128.

Figure 4:
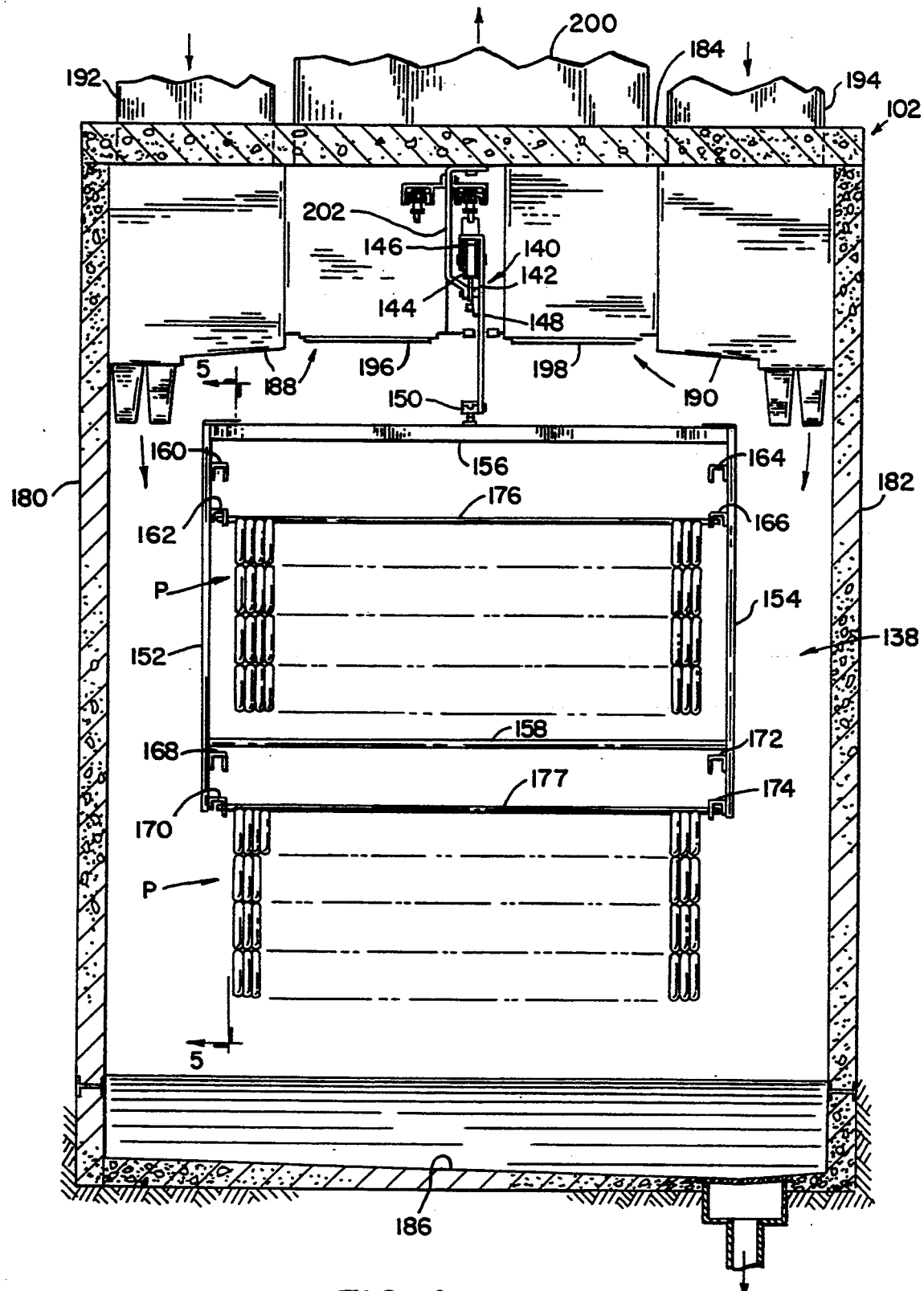
FIG. 4 is a transverse sectional view taken generally along line 4—4 of FIG. 3.

Referring to FIG. 4, a product tree 138 is shown suspended from a trolley assembly, shown generally at 140. Trolley assembly 140 is movably mounted on the rail, shown at 142, by means of a wheel 144 rotatably mounted between a pair of vertical members shown at 146, 148, provided at the upper portion of trolley assembly 140. Vertical member 148 extends downwardly from the upper portion of trolley assembly 140, and a base member 150 is connected at the lower end of vertical member 148.

Product tree 138 includes a pair of spaced vertical side members 152, 154. An upper cross member 156 extends between the upper ends of side members 152, 154, and a lower cross member 158 extends between side members 152, 154 toward their lower ends. A pair of upper brackets 160, 162 are mounted to side member 152 toward its upper end, and a pair of lower brackets 164, 166 are mounted to side member 154 toward its upper end. Brackets 160, 162 and 164, 166 are arranged so as to face each other.

In a similar manner, facing pairs of brackets 168, 170 and 172, 174 are mounted toward the lower ends of vertical members 152, 154, respectively.

A loaded upper product stick 176 extends between brackets 162, 166, and a loaded lower product stick 177 extends between brackets 170, 174. Product sticks 176, 177 are loaded with the meat product being processed, shown generally at P, which may be any meat product such as hot dogs, sausages or the like which are encased during processing in linked casings, and subsequently stripped of their casings after processing. Product sticks 176, 177 are loaded with the linked product P at the output of a stuffing machine, as is known in the art.

When sticks 176, 177 are loaded, they are suspended from brackets 162, 166 and 170, 174, respectively. When sticks 176, 177 are empty, they are placed in brackets 160, 164 and 168, 172, respectively.

As shown in FIG. 5, each of brackets 160, 162, 168 and 170 comprises a generally U-shaped central portion in which the end of a product stick is received. Brackets 164, 166, 172 and 174 on vertical member 154 are similar in construction to brackets 160, 168 and 170 on vertical member 152.

With the construction of product tree 138 as shown and described, particularly with reference to brackets 160-174, loading of the loaded products sticks onto the brackets is easily performed due to the ability of tree 138 to receive a loaded product stick from either its right hand or left hand side, thus facilitating loading regardless of which side is presented to the operator during loading.

Referring again to FIG. 4, product tree 138 is shown passing through heat chamber 102, which is generally defined by a pair of spaced sidewalls 180, 182, an upper wall 184 and a lower wall 186. Air supply ducts 188, 190 receive heated air from ducts 192, 194, respectively, located above upper wall 184. A return air plenum defined by a left side portion 196 and a right side portion 198 is provided for exhausting air from the interior of heat chamber 102 through a duct 200.

A rail hanger 202 is connected at its upper end to the underside of upper wall 184, and at its lower end to rail 142, for spacing rail 142 a predetermined distance below wall 184.

Referring to FIGS. 4, 6 and 7, the upper cross member 156 of product tree 138 is provided with an upstanding member 204. Product tree 138 is suspended from trolley assembly 140 by means of a positioning pin 206 attached to upstanding member 204 by welding, with pin 206 engaging and being supported by base member 150 mounted to the lower end of vertical member 148.

Base member 150 includes a central passage 210 (FIG. 7) through which member 204 extends, and a pair of upwardly facing grooves or recesses 212, 214 formed in the upper surface of base member 150. Grooves 212, 214 extend throughout the entire width of base member 150, and grooves 212, 214 are substantially perpendicular to each other. Pin 206 is movable between grooves 212, 214 so as to selectively position product tree 138 relative to trolley assembly 140. Pin 206 is constructed with a curved lower surface corresponding to the curve of grooves 212, 214, which are angled appropriately for providing ease of movement of pin 206 between grooves 212, 214.

FIGS. 8 and 9 show drive assembly 130 in detail, along with the downstream end of chain loop 114 and the upstream end of chain loop 116.

Referring to FIG. 8, loop 114 is defined by a chain 219 having a drive run 220 and a return run 222. Runs 220, 222, are disposed in a substantially horizontal plane, with chain 219 being on its side.

Drive assembly 130 includes a variable speed drive motor 224. The drive shaft of motor 224 drives a speed reducer 226 which provides power input to a torque limiter 228 (FIGS. 8, 9) through a speed reducer output shaft 230. A drive shaft 232 provides power output from torque limiter 228, and a drive sprocket 234 (FIG. 8) is driven by drive shaft 232. Drive chain 219 is trained around an idler sprocket 238, drive sprocket 234, and a spring-tensioned idler sprocket 236.

Downstream of loop 114 defined by drive chain 219 is a drive chain 240 defining loop 116, and including a drive run 242 and a return run 244.

As shown in FIG. 8, rail 142 extends below drive run 220 of drive chain 219, curving arcuately below idler sprocket 238 in a curve having a radius equal to that of idler sprocket 238, and below drive run 242 of drive chain 240. As noted previously, a series of rail hangers, shown at 202a and 202b, are provided for suspending rail 142 below the lower surface of upper wall 184.

At its upstream end, drive chain 240 is trained around an idler sprocket 246.

Referring briefly to FIG. 6, it is seen that a pusher plate 246 is connected to and extends upwardly from an upper cross member 248 extending between vertical members 146, 148 of trolley assembly 140. Drive chain 219 is provided with a series of evenly spaced engagement fingers 250 extending downwardly from its lowermost surface. Fingers 250 extend downwardly an amount sufficient to engage pusher plate 246 on trolley assembly 140.

A pair of chain guide assemblies, shown at 252, 254 are connected to the underside of a chain support member 256 connected to rail hanger 202. Guide assemblies 252, 254 are substantially identical in construction and operation. Referring to guide assembly 252, an inverted U-shaped bracket 258 has its upper transverse portion connected to support member 256. A pair of angles 260, 262 are connected to the inner surfaces of the legs of bracket 258, and a pair of plastic bearing members 264, 266 are connected to the upper surfaces of angles 260, 262, respectively. Plastic bearing members 264, 266 define a slot therebetween, and a series of chain hangers, one of which is shown at 268, are connected to the uppermost surface of drive chain 219 and extend through the slot between bearing members 264, 266. A support pin 270 is connected to the upper end of chain hanger 268, and has a length sufficient to span the gap between bearing members 264, 266. Chain hangers, such as 268, and support pins, such as 270, a–e provided at intermittent intervals along the length of drive chain 219, for providing adequate support to the chain to maintain it at a predetermined elevation. Engagement fingers 250 are mounted at predetermined intervals to the underside of the chain.

Chain guide assembly 254 functions in a manner similar to that of chain guide assembly 252.

Referring to FIG. 9, a series of trolley assemblies are shown at 140a, 140b and 140c. Trolley assembly 140a is shown as being advanced toward the viewer by engagement of an engaging finger 250a with a pusher plate 246a associated with trolley assembly 140a. Trolley assembly 140b is shown as having turned the corner in rail 142 below idler sprocket 238, and being advanced rightwardly. Trolley assembly 140c is shown as being engaged by an engaging finger associated with drive chain 240.

A downhill area, shown generally at 272, is provided in rail 142 in the space between idler sprocket 238 and idler sprocket 246. Drive run 220 of drive chain 219 advances the trolley assemblies onto downhill portion 272, and the trolley assemblies thereafter travel by gravity on downhill portion 272 into position in preparation for being picked up by downstream drive chain 240. In this manner the trolley assemblies are essentially "handed off" from an upstream drive chain to a downstream drive chain, eliminating the necessity for a mechanical transfer device or the like. Rail 142 is preferably disposed at a very slight angle so as to compensate for elevation lost in downhill portion 272 of rail 142 between adjacent drive chains.

Figure 10:
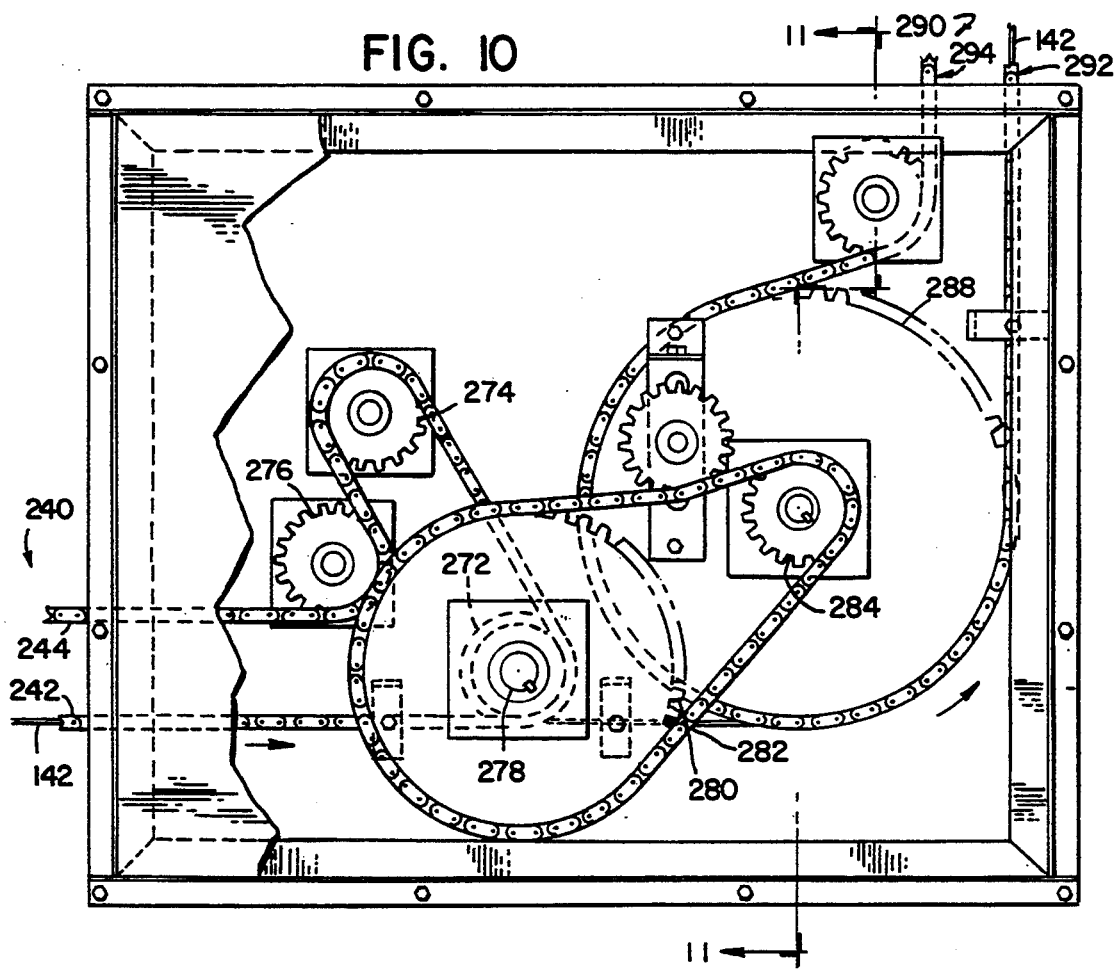
FIG. 10 is an enlarged plan view, with portions broken away, showing a transfer area between an upstream slow conveyor loop which advances the product carriers through a processing chamber, and a downstream fast conveyor loop which advances the product carriers between adjacent processing chamber.
Figure 11:
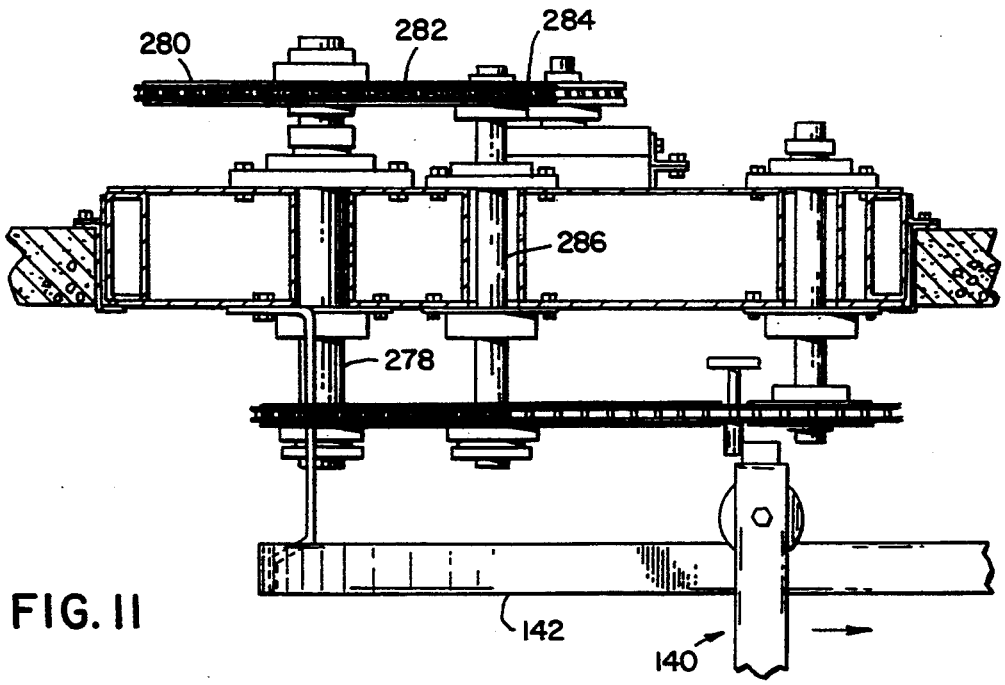
FIG. 11 is a section view taken generally along line 11—11 of FIG. 10.

FIGS. 10 and 11 illustrate the driving interconnection between conveyor loop 116 and conveyor loop 118. As noted previously, loop 116 is defined by a drive chain 240 having a drive run 242 and a return run 244. At its downstream end, drive chain 240 is trained around a lower sprocket 272, an idler sprocket 274, and an idler sprocket 276. Sprocket 272 is mounted to a shaft 278, which extends upwardly through the roof of heat chamber 104 and is connected to an upper sprocket 280. A chain 282 is trained around upper sprocket 280 and a sprocket 284, which is connected to a shaft 286. A lower sprocket 288 is fixed to the lower end of shaft 286, and a down-stream drive chain 290 defining loop 118, and including a drive run 292 and a return run 294, is trained around lower sprocket 288. A drive assembly 132 (FIG. 3) is provided at the downstream end of loop 118 for driving chain 290. Through the chain and sprocket system as shown in FIGS. 10 and 11 and described above, movement of chain 290 is transferred through sprocket 288 to sprocket 284, and through chain 282 to sprocket 280 and shaft 278 to lower sprocket 272, for imparting movement to drive chain 240 in response to operation of drive assembly 132.

A downhill portion is formed in rail 142 between the downstream end of drive chain 240 and the upstream and of drive chain 290 for transferring the trolley assemblies therebetween, as described previously.

With the reduction arrangement achieved by the sprocket and chain assembly shown and described, a single drive assembly, such as 132, provides movement of chain 240 of loop 116 at a relatively slow rate of speed, while moving chain 290 defining loop 118 with a relatively fast rate of speed. The engagement fingers, such as shown at 250 in FIG. 6, are spaced relatively closely on drive chain 240, and are spaced relatively far apart on drive chain 290. This arrangement, in combination with the differential in chain speed provided by the reduction arrangement shown in FIG. 10, provides slow and densely packed movement of product carriers through the processing chambers, such as heat chambers 102 and 104 through which drive chain 240 extends. This concentration of product within the processing chamber optimizes utilization of the interior chamber space. The fast movement of loop 118, extending between the discharge of heat chamber 104 and the inlet of brine chamber 106, provides a rapid advancement of individual product carriers therebetween, thus allowing the number of product carriers passing a point during a given time interval to remain the same as within the processing chamber, even though the carrier spacing has increased.

Drive assemblies 130, 132, 134, 136 and 137 are constructed in the form of plug modules interchangeably mounted at the appropriate location in the system, for simplifying construction and installation of the system.

In operation, when the individual trolley assemblies are passed through the relatively narrow inlet into one of the processing chambers, the trolley assembly is forced to follow the path defined by rail 142. Once inside the processing chamber, rail 142 turns so as to be perpendicular to the entrance of rail 142 into the chamber. This turning of rail 142 while the trolley assembly is advanced therealong causes the product carrier to bump into the inside end wall of the chamber. This action forces positioning pin 206 out of the groove, such as 212, 214, associated with base member 150 in which it was positioned upon entrance into the chamber, and to move into the other of the grooves so as to orient the product carrier substantially perpendicularly to the longitudinal axis of the chamber for processing. At discharge from the processing chamber, substantially the same steps are reversed, with the product carrier bumping into the inside end wall of the processing chamber, causing the product carrier to turn relative to the trolley assembly in preparation for discharge from the processing chamber through the outlet formed in the chamber sidewall.

PRESENT INVENTION

Figure 12:
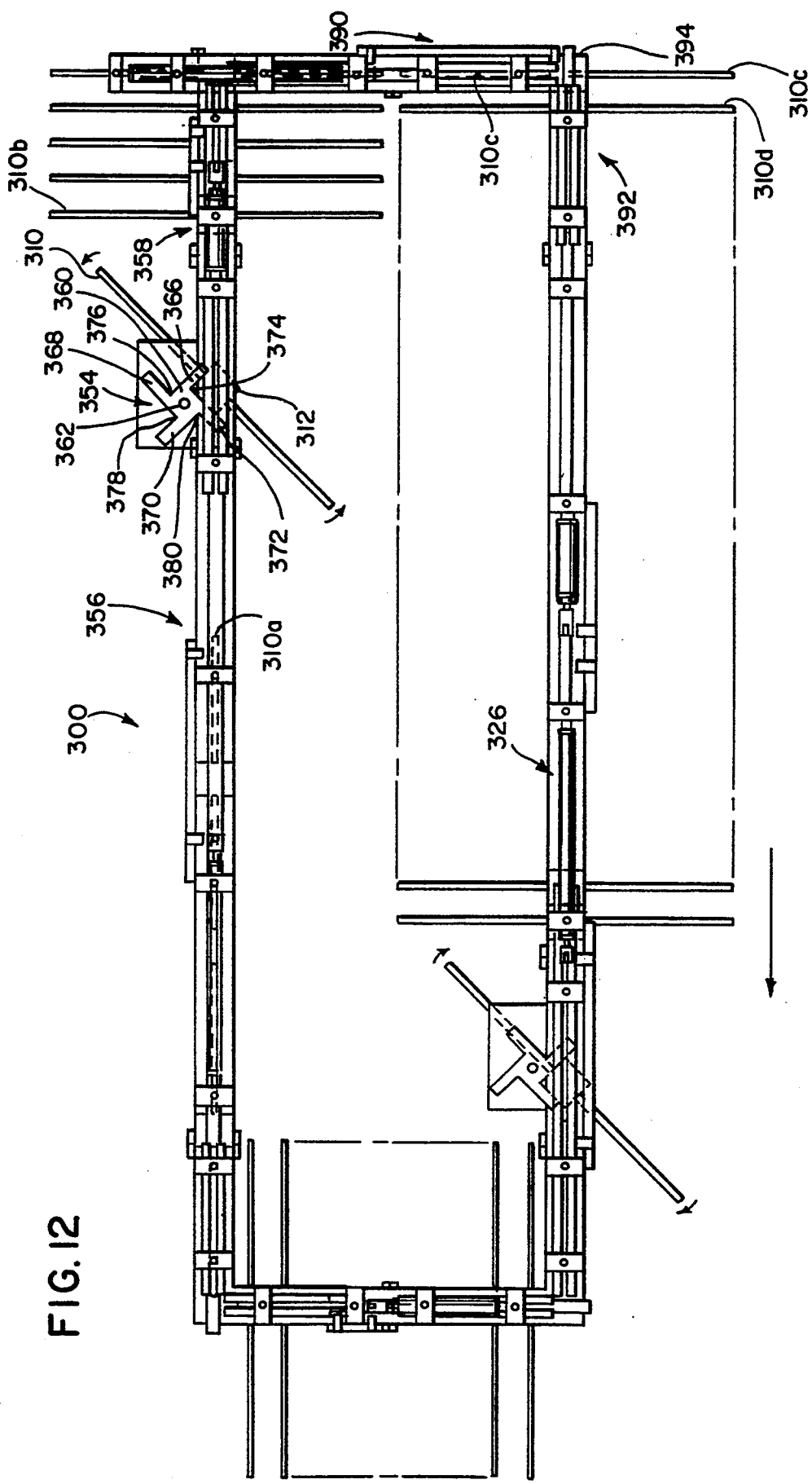
FIG. 12 is an overhead plan view of a food processing transport system in accordance with the present invention.

FIG. 12 shows apparatus 300 for transporting a food product in a food processing system. The system is composed of modular units or sections, shown separated by dashed lines in FIG. 13, which are combinable as building blocks to enable design flexibility, including straight-in and straight-out, FIG. 22, side-in and side-out, FIGS. 23 and 1, straight-in and side-out, FIG. 24, and other combinations.

Figure 25:
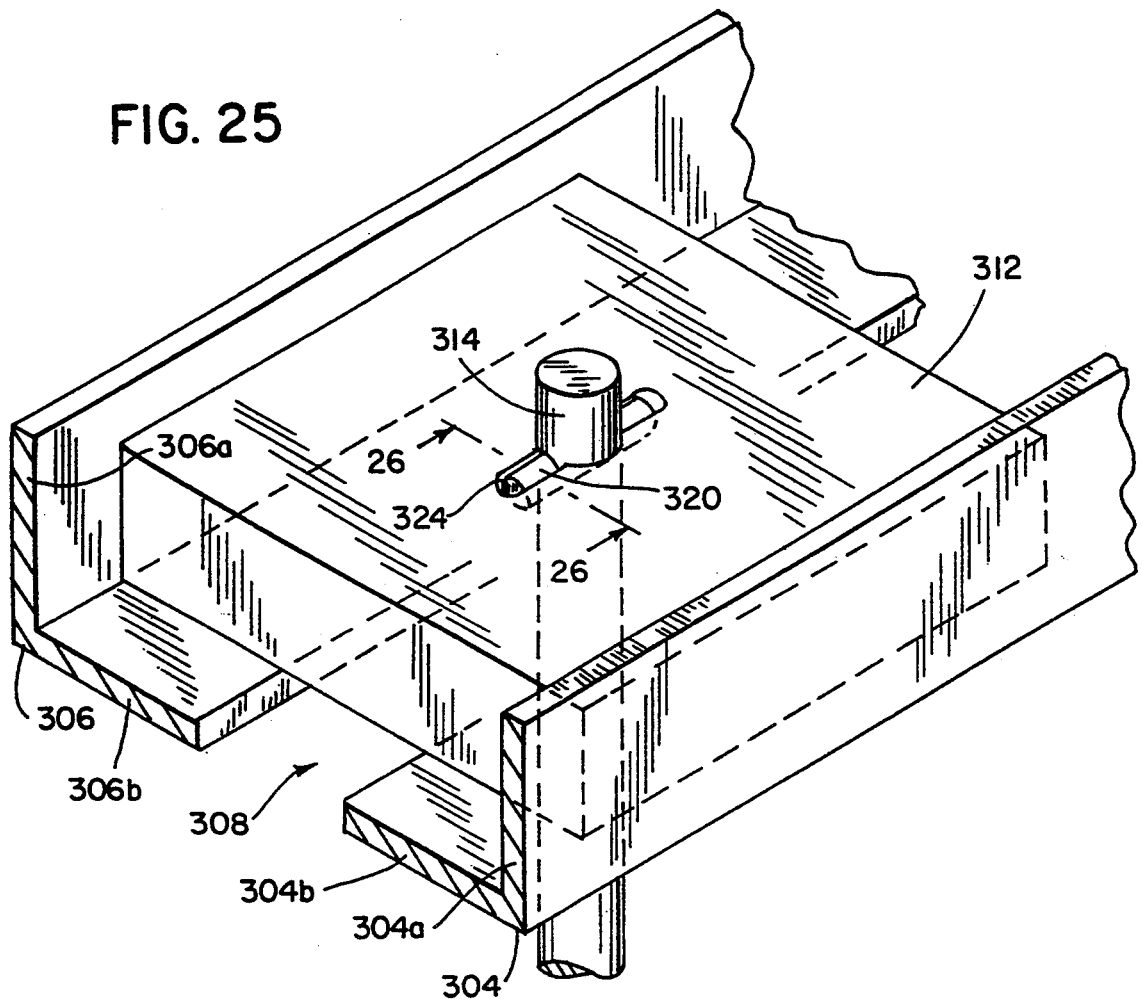
FIG. 25 is an isometric view of a portion of a food product carrier.
Figure 26:
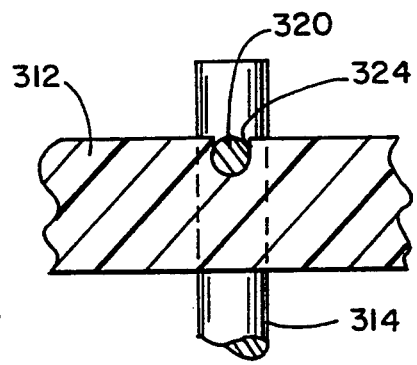
FIG. 26 is a view taken along line 26—26 of FIG. 25.

The system includes an overhead transport rail 302, FIGS. 12-15, provided by a pair of spaced L-shaped channels 304, 306, FIGS. 16 and 25, having a gap 308 therebetween, each L-shaped channel having a vertical leg 304a, 306a, respectively, and a horizontal leg 304b, 306b, respectively. A food product carrier 310, FIG. 14, similar to carrier tree 42, FIG. 2, is suspended from rail 302 and defines a vertical plane. The carrier includes a slider block 312, FIGS. 16 and 25, slidable along the rail, and a hanger rod 314 depending downwardly from the slider block. The slider block is a low friction coefficient plastic member engaging and frictionally sliding along the rail. In the preferred embodiment, the plastic material of slider block 312 is Celcon, available from Celanese Corp. The slider block has an aperture 316, FIG. 18b, extending vertically therethrough, and vertically aligned with gap 308, FIG. 25, between channels 304 and 306. The hanger rod 314 extends vertically through aperture 316. The bottom of hanger rod 314 is welded to cross-member 318, FIG. 14, which supports the lower part of the carrier tree from which the food product is hung, comparably to cross-member 156, FIG. 4, supporting the lower part of carrier tree 42, FIG. 2, as above described. Hanger rod 314 is suspended from the topside of slider block 312 by transverse pin 320, FIGS. 18b, 25, and 26, extending through transverse aperture 322 in rod 314 and resting in recess 324 in the topside of slider block 312. Hanger rod 314 does not rotate relative to slider block 312 because pin 320 is nested and captured in recess 324, and hence the lower part of the carrier tree does not rotate relative to slider block 312. Slider block 312 spans channels 304 and 306, FIGS. 16 and 25, and rests on horizontal legs 304b and 306b and is guided by and laterally trapped between vertical legs 304a and 306a. Rod 314 extends downwardly from slider block 312 through gap 308 between the channels.

A drive mechanism 326 advances food product carrier 310 along overhead rail 302. The drive mechanism includes a second overhead rail 328, FIG. 15, and a slider bar 330 extending longitudinally along and supported by rail 328 and reciprocal along the direction of advancement of carrier 310. The slider bar is a T-shaped member in cross-section, FIG. 16, frictionally slidable along plastic channel tracks 332 and 334. The slider bar has a plurality of depending pawls 336, FIG. 15, pivotably mounted thereto at respective cotter pins 338 and engaging and advancing the food product carrier in one direction of travel. The drive mechanism further includes an air cylinder 340 having a reciprocating plunger 342 engaging slider bar 330 at bracket 344 and having a given travel stroke along a direction parallel to the direction of advancement of the carrier. The plunger has a forward travel stroke, e.g. leftwardly in FIGS. 15 and 18b, advancing the carrier. The plunger has a return stroke, e.g. rightwardly in FIGS. 15 and 18a, nonadvancing the carrier. Pawl 336 has a central recess 346 as seen in end view in FIG. 16 which accommodates the lower portion of slider bar 330 therein to allow upward pivoting of the pawl during the return stroke as shown in FIG. 18a. During the forward stroke of slider bar 330, FIG. 18b, the upper rear edge 348 of the pawl is stopped against the lower edge 350 of slider bar 330, to provide a stop against further counterclockwise pivoting of pawl 336, such that the front edge 352 of the pawl engages rod 314 of the food product carrier to advance the latter leftwardly as seen in FIG. 18b.

The drive mechanism includes other air cylinders and reciprocating plungers, e.g. 346, 348, FIG. 15, spaced along the direction of advancement of the carrier and having different length travel strokes and engaging and advancing the carrier in one direction of travel, such that the carrier is transported by reciprocating member 342 along a first travel stroke, and then is transported by a second reciprocating member 348 along a second different length travel stroke. The reciprocating members are also provided with different speed travel strokes, which is particularly desirable for different packing densities of carriers, to be described.

Referring to FIG. 12, a turning arrangement 354 is provided between first and second runs 356 and 358 of the transport rail. The turning arrangement changes the relative orientation between the vertical plane defined by the carrier and the direction of advancement of the carrier. The plane of the carrier forms a first angle relative to the direction of advancement of the carrier along the first run, e.g. in FIG. 12 this angle is zero degrees such that the plane of carrier 310a is parallel to the direction of advancement along first run 356. The plane of the carrier forms a second angle relative to the direction of advancement of the carrier along second run 358, e.g. in FIG. 12 this angle is 90° such that the plane of carrier 310b is orthogonal to the direction of advancement along second run 358. In FIG. 12, first and second runs 356 and 358 are colinear.

Figure 21:
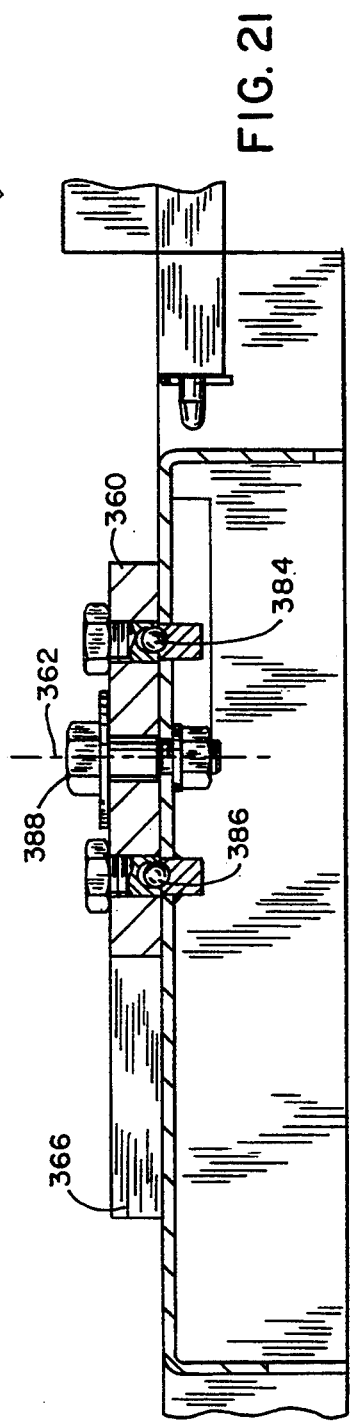
FIG. 21 is a view taken along line 21—21 of FIG. 20.

Turning arrangement 354 includes a rotary member 360 rotatable about an axis 362 orthogonal to the direction of advancement of the food product carrier. In FIG. 12, axis 362 is into and out of the page. Rotary member 360 engages slider block 312 of the carrier during advancement of the latter and rotating the carrier slider block relative to the rail. The rotary member is rotatable to a plurality of angular positions and includes a plurality of arms 366, 368, 370, 372 extending outwardly therefrom and into the path of movement of carrier slider block 312 during a respective angular position of the rotary member. The arms define respective pockets 374, 376, 378, 380 therebetween receiving and cradling slider block 312 of the carrier in interference fit such that further advancement of slider block 312 along transport rail 302 rotates rotary member 360 to in turn rotate slider block 312 of the carrier. Channels 304 and 306, FIG. 16, of the transport rail have sections with removed vertical legs 304a, 306a adjacent rotary member 360, e.g. section 382, FIG. 15, to allow rotation of slider block 312 thereat. The rotary member includes an indexing mechanism providing four indexed angular positions angular positions 90° apart. Rotary member 360 is engaged by slider block 312 of the carrier during advancement of the latter and rotates 90° to the next indexed position, which 90° of rotation rotates the carrier 90° relative to the rail. The indexing mechanism includes spring loaded detent mechanisms, two of which are illustrated at 384 and 386, FIG. 21, holding rotary member 360 in its indexed position until rotated about mounting bolt 388 to the next 90° position.

In another section of the system of FIG. 12, the transport rail includes a run at 390 and a run at 392 which are nonparallel and meet at a junction 394. The plane of carrier 310c forms a first angle relative to run 390 during advancement of the carrier along each of runs 390 and 392. The plane of carrier 310d forms a second angle relative to second run 392 during advancement along each of runs 390 and 392. In the embodiment of FIG. 12, runs 390 and 392 meet at a right angle junction 394, and the plane of carrier 310c is parallel to the direction of advancement of the carrier along run 390, and the plane of carrier 310d is orthogonal to the direction of advancement of the carrier along run 392.

When the transport rail runs are colinear, as at 356 and 358, the turning arrangement, such as 354, rotates the food product carrier, such that the vertical plane of the carrier 310a along the first run 356 is orthogonal to the vertical plane of the carrier 310b along the second run 358. When the transport rail runs are nonparallel, as at 390 and 392, the turning arrangement, as provided by junction 394, does not rotate slider block 312; instead, the rail turns, and the vertical plane of carrier 310c along the first run 390 is parallel to the vertical plane of carrier 310d along second run 392. There is no rotating member at junction 394.

The turning arrangement provided by junction 394 is desirable for the above noted side-in and/or side-out processing travel path, for example as shown at processing chamber 78, FIG. 2, and as shown in FIG. 23. The turning arrangement 354 provided by rotating member 360 is desirable for straight-in and/or straight-out processing flow paths, for example as shown in FIG. 22. The two types of turning arrangements may be used in combination, for example to provide a straight-in and side-out processing flow path as shown in FIG. 24.

The food processing chamber, e.g. 22, FIG. 2, extends longitudinally along a longitudinal axis. It is desired that the chamber have a narrow vertically extending inlet opening such as shown at 66, and a narrow vertically extending outlet opening, to minimize loss of heat or cooling or other processing media. In FIG. 22, the overhead transport rail includes an entry run 402 extending into food processing chamber 404 perpendicularly through inlet opening 406 in end wall 408, a processing run 410 extending longitudinally through the chamber along the longitudinal axis of the chamber, and an exit run 412 extending out of the chamber perpendicularly through an outlet opening 414 in end wall 416. A turning arrangement like 354, including rotary member 460, is provided at location 418 in FIG. 22 to provide an inlet turning arrangement between entry run 402 and processing run 410 and changes the relative orientation between the vertical plane defined by carrier 310a and the direction of advancement of the carrier, such that the plane of the carrier is parallel to entry run 402 as the carrier passes through inlet opening 406, and such that the plane of the carrier is nonparallel to processing run 410 as carrier 310b advances through chamber 404 along the chamber's longitudinal axis. Another turning arrangement like 354 is provided at location 420 in FIG. 22 to provide an outlet turning arrangement between processing run 410 and exit run 412, and changes the relative orientation between the vertical plane of the carrier and the direction of advancement of the carrier, such that the plane of the carrier is nonparallel to processing run 410 as the carrier advances through chamber 404 along the chamber's longitudinal axis, and such that the plane of the carrier is parallel to exit run 412 as the carrier passes through outlet opening 414.

In FIG. 23, entry run 422 extends into processing chamber 424 perpendicularly through inlet opening 426 in sidewall 428. Processing run 430 extends longitudinally through chamber 424 along the longitudinal axis of the latter. Exit run 432 extends out of chamber 424 perpendicularly through outlet opening 434. Junction 436 provides an inlet turning arrangement, comparably to junction 394, FIG. 12, between entry run 422 and processing run 430, and changes the relative orientation between the vertical plane defined by the food product carrier and the direction of advancement of the carrier, such that the plane of carrier 310c is parallel to entry run 422 as the carrier passes through inlet opening 426, and such that the plane of carrier 310d is nonparallel to processing run 430 as the carrier advances through chamber 424 along the longitudinal axis of the latter. Junction 438 provides an outlet turning arrangement between processing run 430 and exit run 432, and changes the relative orientation between the vertical plane defined by the carrier and the direction of advancement of the carrier, such that the plane of the carrier is nonparallel to processing run 430 as the carrier advances through chamber 424 along the longitudinal axis of the latter, and such that the plane of the carrier is parallel to exit run 432 as the carrier passes through outlet opening 434.

In each of the embodiments in FIGS. 22 and 23, the plane of the food product carrier passes through the inlet and outlet openings of the processing chamber in an orientation such that the plane of the carrier is parallel to the direction of advancement along the rail through the opening, thus facilitating the above noted desirable narrow width opening. In FIG. 22, the food product carrier passes through inlet opening 406 along a direction of advancement parallel to the longitudinal axis of chamber 404, and passes through outlet opening 414 along a direction of advancement parallel to the longitudinal axis of chamber 404. In FIG. 23, the product carrier passes through inlet opening 426 along a direction of advancement nonparallel to the longitudinal axis of chamber 424, and passes through outlet opening 434 along a direction of advancement nonparallel to the longitudinal axis of chamber 424.

In FIG. 22, each of inlet and outlet openings 406 and 414 is defined by a vertical height and a substantially smaller lateral width defining first and second respective vertical planes, each of which is coincident with its respective end wall 408, 416, and each of which is orthogonal to the longitudinal axis of chamber 404, and wherein such longitudinal axis extends through inlet and outlet openings 406 and 414. In the embodiment in FIG. 23, each of the inlet and outlet openings 426 and 434 is defined by a vertical height and a substantially smaller lateral width defining a plane parallel to the longitudinal axis of chamber 424.

Various combinations of the modular sectional building blocks of FIGS. 12 and 13 may be provided, including various combinations of portions of FIGS. 22 and 23. For example, FIG. 24 shows a straight-in and side-out processing path. In FIG. 24, entry run 452 extends into processing chamber 454 through inlet opening 456 in end wall 458, and a turning arrangement like 354 is provided at location 460 between entry run 452 and processing run 462, all as in FIG. 22. An exit run 464 extends out of chamber 454 through outlet opening 466 in sidewall 468, and a junction turning arrangement is provided at location 470 between processing run 462 and exit run 464, all as in FIG. 23. Other combinations are of course possible and provide significant design flexibility in connecting various processing stations such as shown in FIGS. 1 and 2 and other arrangements.

The turning mechanism is disposed along the transport rail preferably between first and second different speed reciprocating members and changes the relative orientation between the carrier and the direction of advancement of the carrier to provide different densities of plural carriers, including high density closely spaced carriers within the processing chamber, and low density widely spaced carriers outside of the processing chamber. The high density within the processing chamber is desirable for maximum space utilization of the processing environment. The high density closely spaced carriers are advanced with a slow speed travel stroke of the respective reciprocating plunger member. The low density widely spaced carriers are advanced with a fast speed travel stroke of the respective reciprocating plunger member. In FIG. 22, the fast and slow speed travel stroke reciprocating members extend along respective rail sections which are colinear. In FIG. 23, the fast and slow speed travel stroke reciprocating members extend along respective rail sections which are nonparallel to each other.

Figure 20:
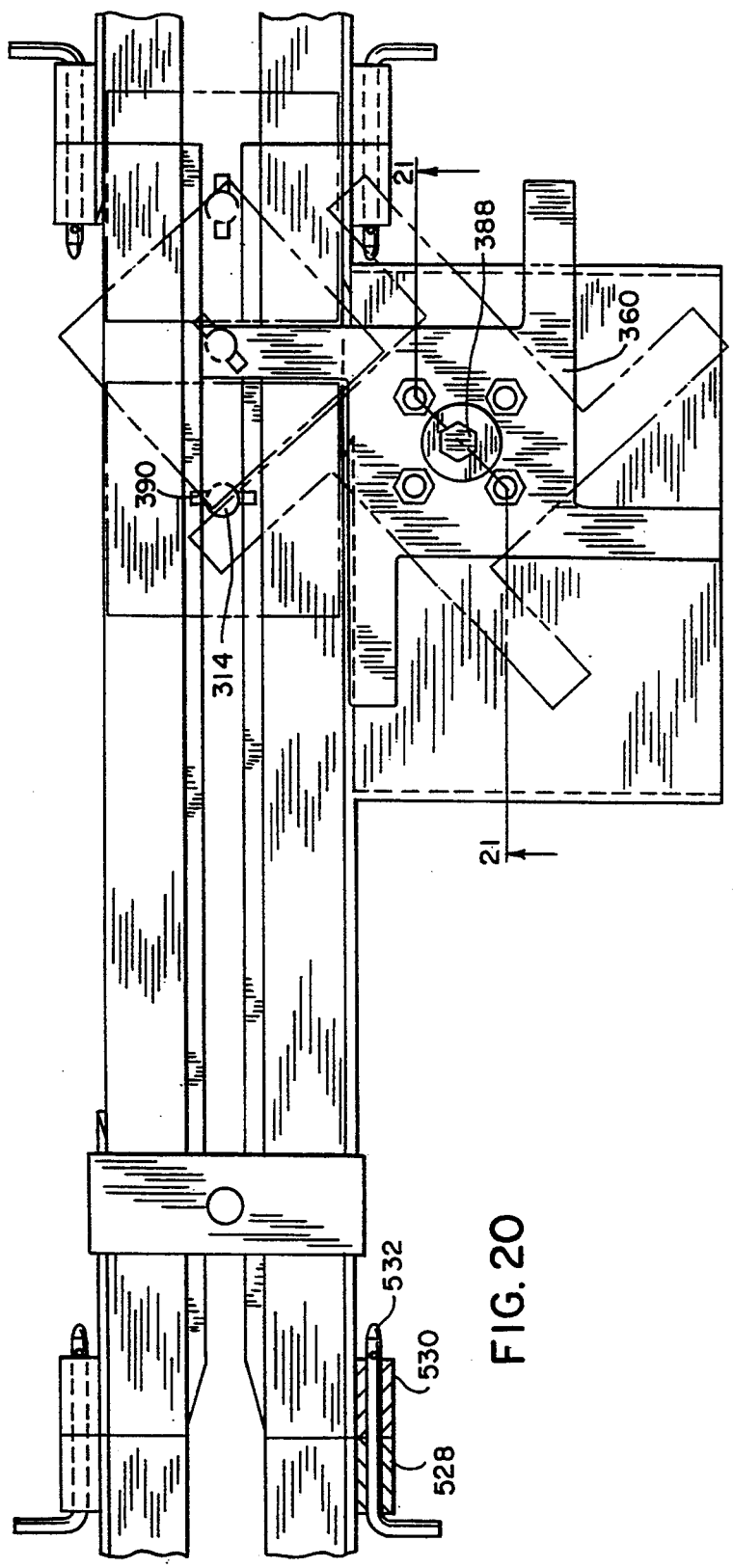
FIG. 20 is an enlarged top view of a portion of the system of FIG. 12.

FIG. 13 shows the modular building block sections of FIG. 12 separated by dashed line. Section 480 is suitable for a side-out processing chamber and provides a junction type turning arrangement at junction 482 between runs 484 and 486. Processing run 484 extends along the longitudinal axis of the processing chamber, and exit run 486 extends out of the processing chamber through a sidewall thereof. The plane of the food product carriers is orthogonal to the direction of advancement thereof along processing run 484. The plane of the food product carriers is parallel to the direction of advancement thereof along exit run 486. A slow speed travel stroke plunger advances the food product carriers along run 484 to junction 482. A high speed travel stroke plunger advances the food product carriers from function 482 along exit run 486. Section 488 is suitable for high speed low density transport of the food product carriers between processing chambers, wherein a high speed long travel stroke plunger advances the carriers, and the plane of the carriers is parallel to the direction of advancement thereof along run 488. Section 490 is suitable for a straight-in processing chamber, and uses turning arrangement 354 including rotary member 360. The plane of the food product carriers is parallel to the direction of advancement thereof along run 492, and after turning by rotary member 360, the plane of the food product carriers is orthogonal to the direction of advancement thereof along processing run 494. Section 496 is suitable for a side-out processing chamber and includes a junction type turning arrangement at the junction 498 of processing run 500 and exit run 502. Processing run 500 extends along the longitudinal axis of the chamber, and exit run 502 extends through a sidewall of the chamber. The plane of the food product carriers is orthogonal to the direction of advancement thereof along processing run 500. The plane of the food product carriers is parallel to the direction of advancement thereof along exit run 502. Section 504 is suitable for a side-in processing chamber and includes a junction type turning arrangement at the junction 394 of entry run 390 and processing run 392. Entry run 390 extends into the chamber through a sidewall thereof, and processing run 392 extends along the longitudinal axis of the chamber. The plane of the food product carriers is parallel to the direction of advancement thereof along entry run 390. The plane of the food product carriers is orthogonal to the direction of advancement thereof along processing run 392. Section 506 is suitable for a processing run within the chamber, for example processing run 410 of chamber 404, FIG. 22, processing run 430 of chamber 424, FIG. 23, processing run 462 of chamber 454, FIG. 24. The plane of the food product carriers is orthogonal to the direction of advancement thereof along run 508, and the carriers are advanced by a slow speed travel stroke plunger. Section 510 is suitable for a straight-out processing chamber, and has a turning arrangement 512 including a rotary member 514, comparable to turning arrangement 354 and rotary member 360, between processing run 516 and exit run 518, for changing the relative orientation between the product carrier and the direction of advancement thereof along the transport rail. The plane of the food product carriers is orthogonal to the direction of advancement thereof along processing run 516, and upon turning by rotary member 514, the plane of the food product carriers is parallel to the direction of advancement thereof along exit run 518. Section 520 is suitable for a side-in processing chamber, and has a junction type turning arrangement at the junction 522 of entry run 524 and processing run 526. The plane of the food product carriers is parallel to the direction of advancement thereof along entry run 524. The plane of the food product carriers is orthogonal to the direction of advancement thereof along processing run 526. A fast speed travel stroke plunger advances the carriers along run 524 to junction 522, and a slow speed travel stroke plunger advances the carriers from junction 522 along processing run 526. The variously noted sections are mounted to each other at brackets such as 528, 530, FIG. 20, having an alignment pin 532 inserted therethrough. Proximity switches, such as 534, FIG. 16, are provided for monitoring and coordinating advancement of the various reciprocating plungers.

As noted above, in the preferred embodiment, the lower part of the food product carrier at cross-member 318 does not rotate relative to slider block 312. In other embodiments, the lower part of the carrier may rotate relative to slider block 312 and/or hanger rod 314, comparably to the lower part of carrier tree 42 rotating relative to the upper part thereof.

It is recognized that various equivalents, alternatives and modifications are possible within the scope of the appended claims.

We claim:

1. Food processing apparatus comprising:
   a processing chamber extending longitudinally along
      a longitudinal axis and having
      a narrow vertically extending inlet opening and
      a narrow vertically extending outlet opening;
   an overhead rail having
      an entry run extending into said chamber perpendicularly through said inlet opening,
      a processing run extending longitudinally through said chamber along said longitudinal axis, and
      an exit run extending out of said chamber perpendicularly through said outlet opening;
   a food product carrier suspended from said rail and defining a vertical plane;
   a drive mechanism advancing said carrier along said rail;
   an inlet turning arrangement between said entry run and said processing run and changing the relative orientation between the vertical plane defined by said carrier and the direction of advancement of said carrier such that
      said plane of said carrier is parallel to said entry run as said carrier passes through said inlet opening, and
      said plane of said carrier is nonparallel to said processing run as said carrier advances through said chamber along said longitudinal axis;
   an outlet turning arrangement between said processing run and said exit run and changing the relative orientation between the vertical plane defined by said carrier and the direction of advancement of said carrier such that
      said plane of said carrier is nonparallel to said processing run as said carrier advances through said chamber along said longitudinal axis, and
      said plane of said carrier is parallel to said exit run as said carrier passes through said outlet opening.

2. The invention according to claim 1 wherein in said product carrier passes through said inlet opening along a direction of advancement nonparallel to said longitudinal axis.

3. The invention according to claim 1 wherein said product carrier passes through said outlet opening along a direction of advancement nonparallel to said longitudinal axis.

4. The invention according to claim 1 wherein said product carrier passes through said inlet and outlet openings along respective first and second directions of advancement, each nonparallel to said longitudinal axis.

5. The invention according to claim 4 wherein said first and second directions of advancement are parallel to each other.

6. The invention according to claim 1 wherein said product carrier passes through said inlet opening along a direction of advancement parallel to said longitudinal axis.

7. The invention according to claim 1 wherein said product carrier passes through said outlet opening along a direction of advancement parallel to said longitudinal axis.

8. The invention according to claim 1 wherein said product carrier passes through said inlet and outlet openings along respective first and second directions of advancement, each parallel to said longitudinal axis.

9. The invention according to claim 1 wherein said inlet opening is defined by a vertical height and a substantially smaller lateral width defining a plane parallel to said longitudinal axis.

10. The invention according to claim 1 wherein said outlet opening is defined by a vertical eight and a substantially smaller lateral width defining a plane parallel to said longitudinal axis.

11. The invention according to claim 1 wherein said inlet and outlet openings are each defined by a vertical height and a substantially smaller lateral width defining first and second respective vertical planes, each of which is parallel to said longitudinal axis.

12. The invention according to claim 11 wherein said first and second vertical planes of said inlet and outlet openings, respectively, are coplanar.

13. The invention according to claim 1 wherein said longitudinal axis extends through said inlet opening.

14. The invention according to claim 1 wherein in said longitudinal axis extends through said outlet opening.

15. The invention according to claim 1 wherein said longitudinal axis extends through both of said inlet and outlet openings.

* * * * *